(12) United States Patent
Mazutis

(10) Patent No.: US 9,446,360 B2
(45) Date of Patent: Sep. 20, 2016

(54) MICROFLUIDIC SYSTEM AND METHODS FOR HIGHLY SELECTIVE DROPLET FUSION

(75) Inventor: Linas Mazutis, Strasbourg (FR)

(73) Assignees: UNIVERSITE DE STRASBOURG, Strasbourg (FR); CENTRE NATIONAL DE LA RECHERCHE SCIENTIFQUE, Paris (FR)

( * ) Notice: Subject to any disclaimer, the term of this patent is extended or adjusted under 35 U.S.C. 154(b) by 1202 days.

(21) Appl. No.: 13/319,180

(22) PCT Filed: May 7, 2010

(86) PCT No.: PCT/EP2010/056297
§ 371 (c)(1),
(2), (4) Date: Dec. 22, 2011

(87) PCT Pub. No.: WO2010/128157
PCT Pub. Date: Nov. 11, 2010

(65) Prior Publication Data
US 2012/0108721 A1 May 3, 2012

Related U.S. Application Data

(60) Provisional application No. 61/176,281, filed on May 7, 2009, provisional application No. 61/244,925, filed on Sep. 23, 2009.

(51) Int. Cl.
| | | |
|---|---|---|
| *B01F 5/06* | (2006.01) | |
| *B01F 3/08* | (2006.01) | |
| *B01F 13/00* | (2006.01) | |
| *B01J 19/00* | (2006.01) | |
| *B01L 3/00* | (2006.01) | |

(52) U.S. Cl.
CPC ........... *B01F 5/0646* (2013.01); *B01F 3/0807* (2013.01); *B01F 5/0647* (2013.01); *B01F 13/0062* (2013.01); *B01F 13/0071* (2013.01); *B01J 19/0093* (2013.01); *B01L 3/502769* (2013.01); *B01J 2219/0086* (2013.01); *B01J 2219/0097* (2013.01); *B01J 2219/00889* (2013.01); *B01J 2219/00891* (2013.01); *B01J 2219/00909* (2013.01); *Y10T 137/0318* (2015.04)

(58) Field of Classification Search
CPC .............. B01F 5/0646; B01F 13/0071; B01J 19/0093
USPC .................................. 422/502; 516/9; 137/1
See application file for complete search history.

(56) References Cited

U.S. PATENT DOCUMENTS

| | | |
|---|---|---|
| 2006/0078888 A1 | 4/2006 | Griffiths et al. |
| 2006/0110831 A1 | 5/2006 | Kijlstra et al. |
| 2007/0052781 A1 | 3/2007 | Fraden et al. |
| 2007/0195127 A1 | 8/2007 | Ahn et al. |
| 2007/0281304 A1 | 12/2007 | Gianchandani et al. |
| 2008/0314761 A1 | 12/2008 | Herminghaus et al. |

FOREIGN PATENT DOCUMENTS

DE 10322893 12/2004

OTHER PUBLICATIONS

Bremond, N. et al. "Decompressing Emulsion Droplets Favors Coalescence" *Physical Review Letters*, Jan. 18, 2008, pp. 024501-1-024501-4.

Hung, L. et al. "Alternating droplet generation and controlled dynamic droplet fusion in microfluidic device for CdS nanoparticle synthesis" *Lab on a Chip*, 2006, pp. 174-178, vol. 6.

Written Opinion in International Application No. PCT/EP2010/056297, Oct. 1, 2010, pp. 1-8.

*Primary Examiner* — Edward Cain
(74) *Attorney, Agent, or Firm* — Saliwanchik, Lloyd & Eisenschenk

(57) ABSTRACT

A method and chip for fusing droplets in a chip comprising (i) providing a first set of droplets which are partially or not stabilized by surfactant, (ii) providing a second set of droplets which are stabilized by surfactant, (iii) contacting each droplet of the first set with single or multiple droplets of the second set in a pairing module and (iv) fusing droplets of the first set with droplets of the second set through a droplet fusion module in which the droplets experience at least one acceleration and/or deceleration and/or reorientation and/or rearrangement in space and time.

12 Claims, 13 Drawing Sheets

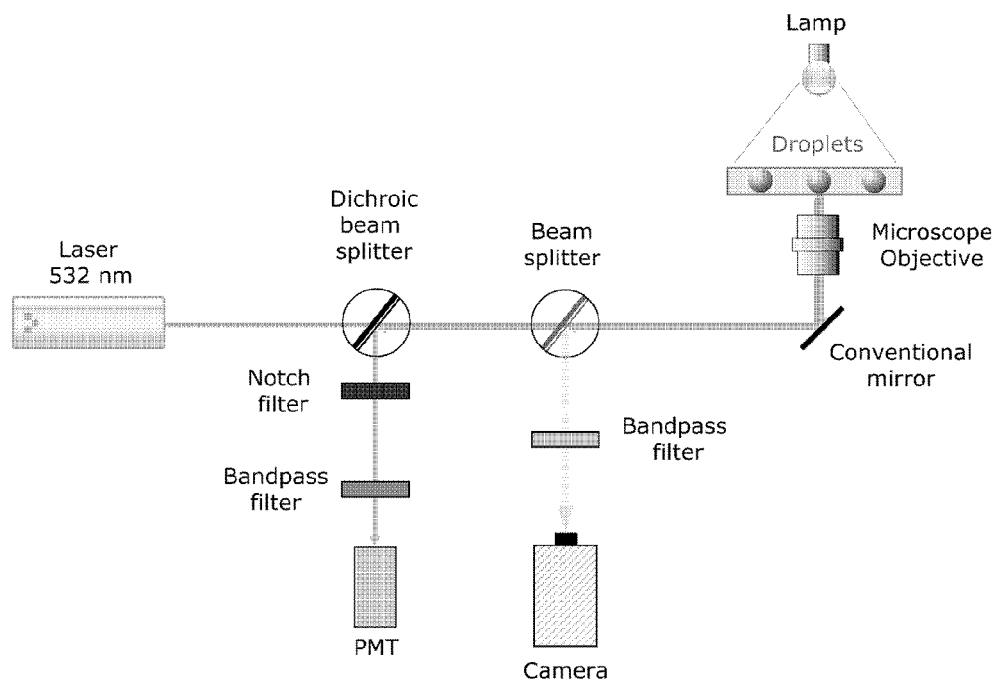
Figure 2
Fig. 3A
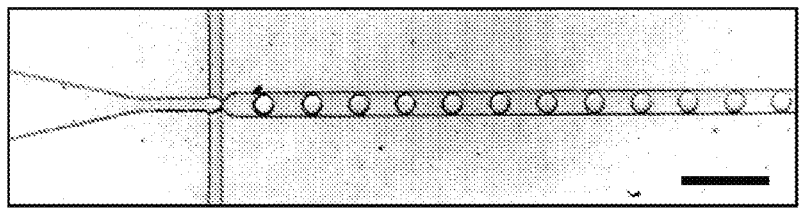
Fig. 3B
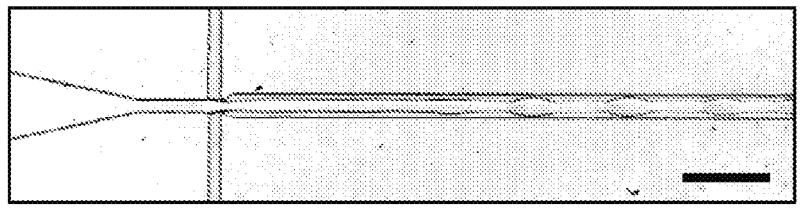
Fig. 3C
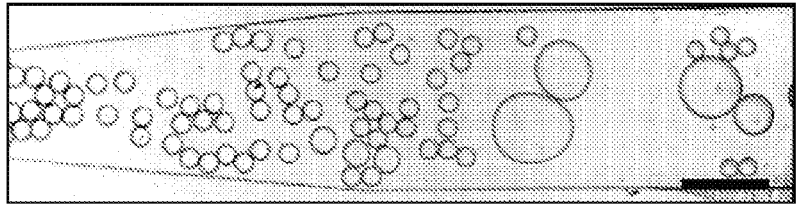

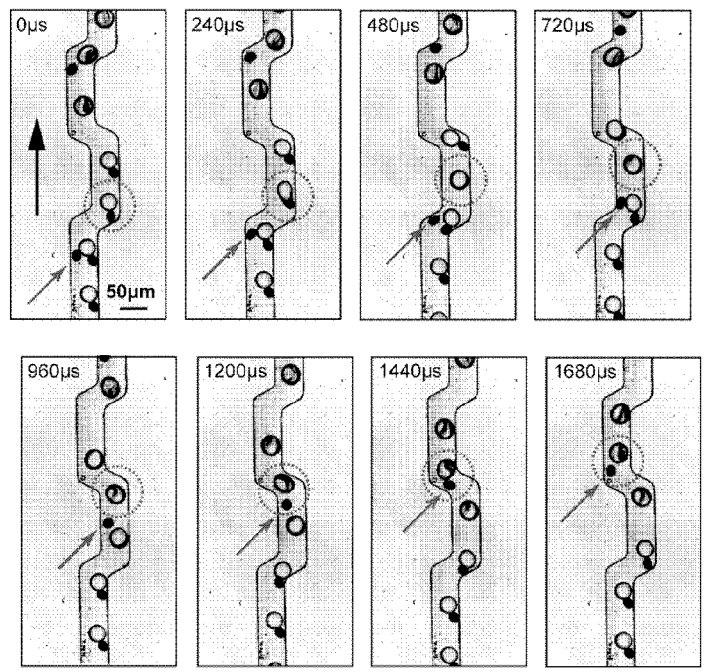
Figure 4
Fig. 5A
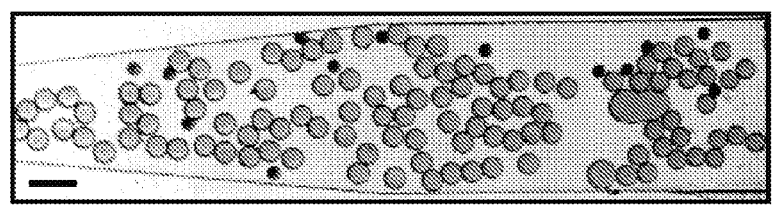
Fig. 5B
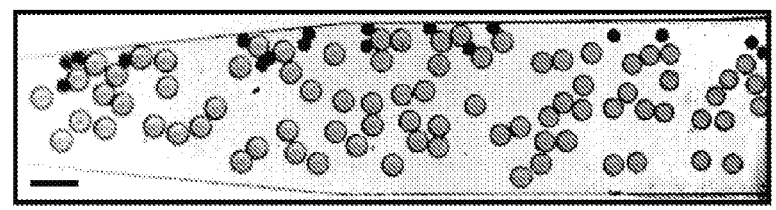
Fig. 5C
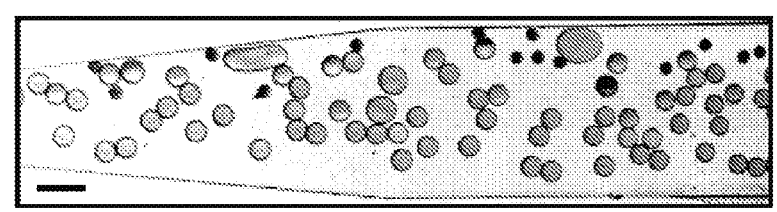

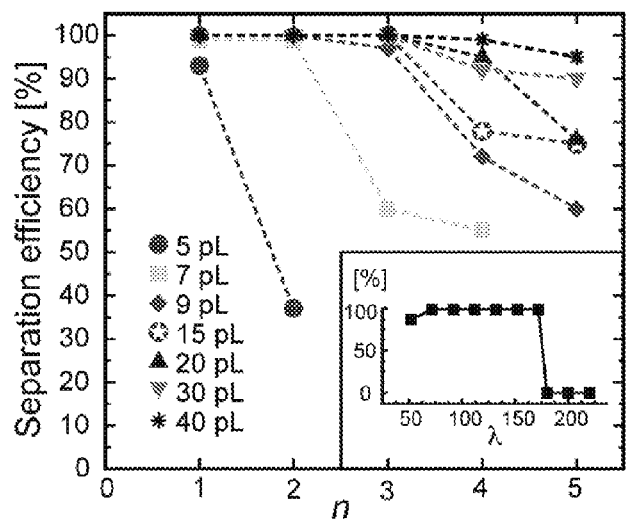
Figure 9
Fig. 10A
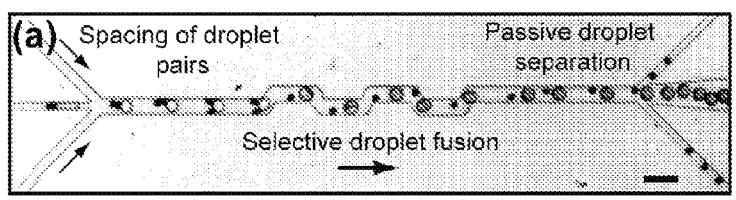
Fig. 10B
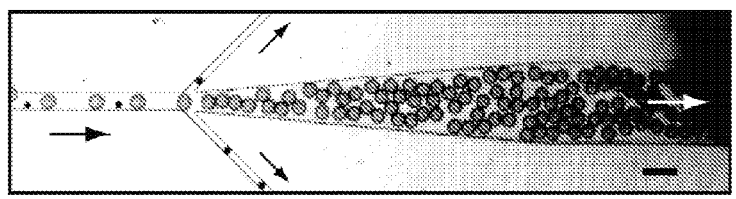
Fig. 10C
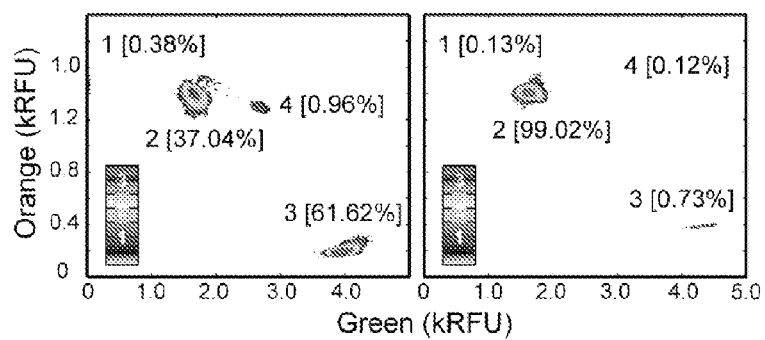

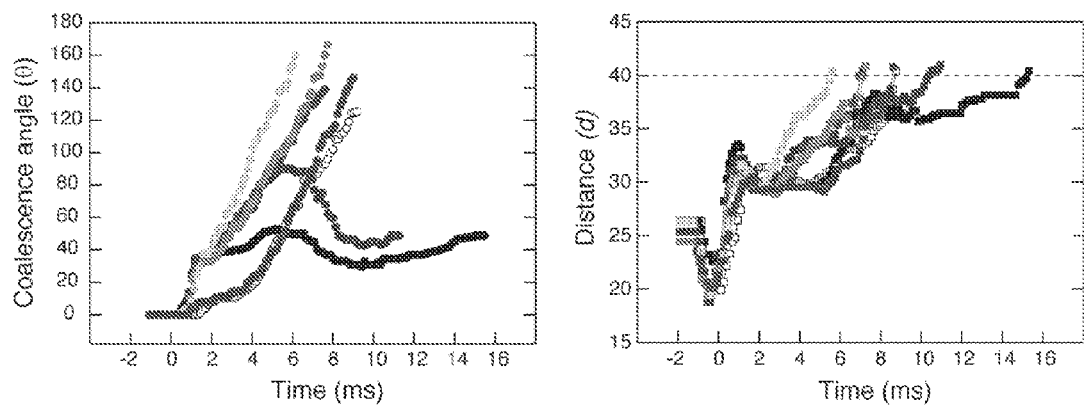
Figure 17
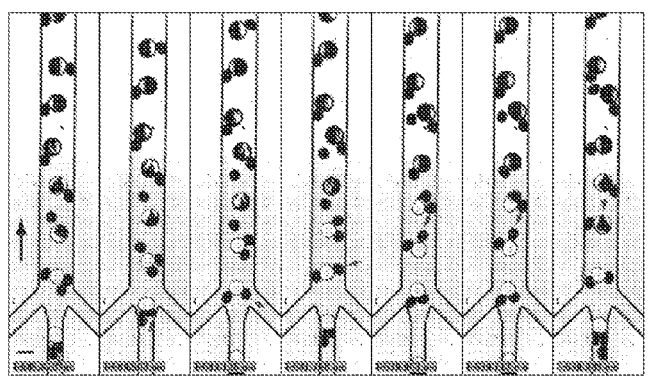
Figure 18
Fig. 19A    Fig. 19B    Fig. 19C
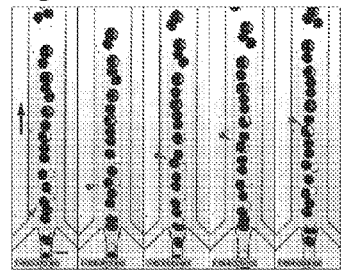 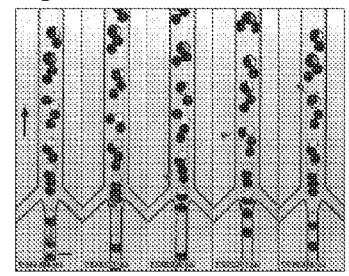 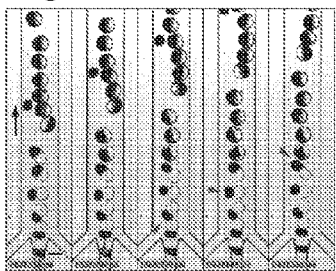

MICROFLUIDIC SYSTEM AND METHODS FOR HIGHLY SELECTIVE DROPLET FUSION

CROSS-REFERENCE TO RELATED APPLICATION

This application is the U.S. national stage application of International Patent Application No. PCT/EP2010/056297, filed May 7, 2010 which claims the benefit of U.S. Provisional Patent Application Nos. 61/176,281, filed May 7, 2009 and 61/244,925, filed Sep. 23, 2009, the disclosures of which are hereby incorporated by reference in their entireties, including all figures, tables and amino acid or nucleic acid sequences.

FIELD OF THE INVENTION

The present invention is directed to systems and methods for reliable droplet fusion in a microfluidic system. The present invention also relates to micro fluidic systems and methods for fast and efficient size-dependent separation of droplets using hydrodynamics.

BACKGROUND OF THE INVENTION

All but the simplest reactions and assays require multiple steps where new reagents are added between steps. In microtitre-plate based systems, this is achieved by pipetting in new reagents at defined times. However, even using sophisticated (and expensive) robotic liquid-handling systems the throughput is little more than one per second. The quest for higher throughput is, of necessity, driving the development of ever smaller reaction vessels. However, there is little scope to further reduce reaction volumes below the current minimum of 1-2 µl using microtitre plate technology.

One option is to use microdroplets in water-in-oil emulsions as microreactors: the droplets have volumes $10^3$ to $10^9$ times smaller than the smallest working volume in a microtitre plate well. In Vitro Compartmentalization (IVC) (Tawfik and Griffiths, 1998) of reactions in emulsions was initially developed for directed evolution and has allowed the selection of a wide range of proteins and RNAs for binding, catalytic and regulatory activities (Griffiths and Tawfik, 2006). Other applications rapidly followed, notably massively parallel PCR of single DNA molecules (emulsion PCR), which is used, for example, for two commercial 'next-generation'high-throughput sequencing systems (Mardis, 2008).

However, it is difficult to add reagents to droplets in bulk emulsions after they are formed, which is a serious limitation. This problem can potentially be overcome using droplet-based microfluidic systems, in which controlled pairwise droplet fusion is possible. There are several ways to fuse aqueous droplets within microfluidic channels. Droplets that are not stabilized by surfactant will coalesce spontaneously (Song et al., 2003; Hung et al., 2006; Tan et al., 2007; Niu et al., 2008; Um et al., 2009; Sassa et al., 2008), or can be coalesced based on a surface energy pattern on the walls of a microfluidic device (Fidalgo et al., 2007; Liu and Ismagilov, 2009), or a new stream of fluid can be merged with large droplets passing the orifice (Zheng and Ismagilov, 2005). Surfactant stabilized droplets can be fused using local heating from a focused laser (Baroud et al., 2007) or using electric forces (Link et al., 2006; Priest et al., 2006) and electro-coalescence has been used to measure millisecond enzyme kinetics (Aim et al. 2006) and for the synthesis of magnetic iron oxide nanoparticles (Frenz et al. 2008).

The main problem in droplet coalescence for biological or chemical applications is the existence of two contradictory constraints: first the stability of droplets as microreactors has to be guaranteed and second, these droplets have to be destabilized when necessary. Spontaneous fusion of droplets without surfactant requires careful droplet synchronization and often gives high numbers of undesirable fusion events. In addition, in the absence of surfactant, further droplet manipulations are restricted because the fused droplets are unstable. The use of external force is therefore a straightforward solution but not perfect: coalescence induced by heating with a laser is not suitable for most biological or heat-sensitive chemical reactions and the throughput is limited to ~10 fusions per second, while electro-coalescence, requires precise droplet synchronization, sophisticated equipment, including micro fluidics chips with integrated electrodes and good electrical shielding to prevent unwanted electro-coalescence. All of these difficulties limit broader droplet-fusion applications, especially if multiple processing steps are necessary.

Hence, to date, droplets have only been fused shortly after formation, and pairwise droplet fusion has only been used to initiate reactions and not to perform multi-step procedures. However, many reactions need to be incubated for certain periods of time, sufficiently long to achieve desirable amounts of product (e.g. to obtain high yields of in vitro translated protein, to amplify DNA, to bind a drug target etc.), before new reagents are added. Therefore what is needed in the art are systems and methods for an efficient and reliable generation system allowing controllable and reliable droplet fusion which can be used to perform multi-step procedures.

SUMMARY OF THE INVENTION

Microdroplets in micro fluidic systems can be used as independent microreactors to perform a range of chemical and biological reactions. However, in order to add new reagents to pre-formed droplets at defined times, to start, modify, or terminate a reaction, it is necessary to perform a controlled fusion with a second droplet. The present invention is directed to a novel droplet fusion system and method allowing high-throughput and highly controllable pairwise (one-to-one) and multiple fusions between droplets. The technique is based on the control of the droplet interface and, more specifically, transient states in the build-up of surfactant molecules at the droplet interface. This technique enables the reliable fusion of droplets, which are generated on a microfluidic device—but not fully stabilized by surfactant—with surfactant-stabilized droplets in microfluidic channels. This method is completely passive: it does not require electrical fields, lasers, special treatment of microfluidics channels nor accurate droplet synchronization. After fusion the emulsion can be collected and re-injected onto a microfluidic device in the absence of undesirable coalescence for further manipulations or analysis. The systems and methods of the present invention can be used to perform miniaturized biological assays or chemical reactions in droplets.

In one aspect, the invention comprises a microfluidic system for the formation of one-to-one droplet pairs and fusing them. In another aspect, the invention comprises a microfluidic system for the formation of multiple droplet clusters and fusing them. In one exemplary embodiment, the system comprises:

(i) an emulsion re-injection module;
(ii) an on-chip droplet generation module;
(iii) a droplet-pairing module; and
(iv) a droplet fusion module.

In one exemplary embodiment, the system further comprises at least one droplet stabilization module.

In one exemplary embodiment, the system further comprises a collection module. The collection module may be integrated into the systems ("on-chip") or separated from the system ("off-chip").

In one exemplary embodiment, the system further comprises an emulsion stability measurement module. In another exemplary embodiment, all modules are integrated on a single microfluidic chip.

In one exemplary embodiment, the on-chip droplet generation module is in communication with the droplet-pairing module; the emulsion re-injection module is in communication with the droplet-pairing module downstream of the on-chip generation module; the droplet pairing module is connected to the droplet fusion module; the at least one droplet stabilization module is connected to the droplet pairing module downstream from the emulsion re-injection module and upstream of the droplet fusion module; and the collection module is in communication with the droplet fusion module. When present in the exemplary embodiment described above, the emulsion stabilization module is in communication with droplet fusion module upstream of the collection module.

In one exemplary embodiment, the droplet fusion module has a zig-zag geometry. In one non-limiting embodiment the droplet fusion module consists of 50 µm wide and 140 µm long segmented channels connect at an angle of 117° by 40 µm wide sections. As used herein, the terms droplet fusion module and coalescence module are interchangeable.

In another aspect, the invention comprises methods for the formation of one-to-one fused droplets. In one exemplary embodiment, the method comprises:
a) generation of a first set of droplets;
b) generation or reinjection of a second set of droplets;
c) fusion of the first and second set of droplets to form fused droplets; and
d) collection of the fused droplets.

In another aspect, the invention comprises a method for conducting a chemical or biological reaction. In one exemplary embodiment, the method comprises:
a) generation of a first set of droplets containing a first set of reactants;
b) generation or reinjection of a second set of droplets containing a second set of reactants;
c) fusion of the first and second set of droplets to form fused droplets and initiate, modify or terminate the reaction between the first set of reactants and the second set of reactants to generate, modify or induce the formation of a product; and
d) collection of the fused droplets.

The product of the reaction can then be isolated from the fused droplets, or the fused droplets can be re-injected for fusion with a third set of droplets containing a third set of reactants. This process can then be repeated as many times as required by the chemical or biological reaction to arrive at the desired final reaction product.

In one exemplary embodiment, the above methods are carried out using a microfluidic system. In another exemplary embodiment, the first set of droplets and second set of droplets are generated on the same device. In yet another exemplary embodiment, the second set of droplets are generated on a separate device, collected, and then injected into the device used to produce the first set of droplets.

In one exemplary embodiment, the first set of droplets contains a lower concentration of surfactant at the interface than the second set of droplets. In one non-limiting example, the concentration of surfactant in the carrier oil used to produce the first set of droplets is less than 3% and the concentration in the second set of droplets is greater than 3%, preferably greater than 4%. In another exemplary embodiment, the first and second set of droplets contain the same surfactant. In another exemplary embodiment, the first and second droplets contain different surfactants. The present invention is not limited by the type of surfactant or carrier oil used. The type of surfactant to be used will depend on the surfactant's effectiveness in stabilizing the interface of droplets, as well as in facilitating fusion of the first and second sets of droplets, as well as the surfactant's compatibility with any reactants contained within the first and second droplet pairs. One of ordinary skill in the art will be able to select the appropriate surfactant and carrier oil based on the desired properties of the droplets and reaction conditions used. In additions, the present invention provides a system by which different surfactants and surfactant combinations can be assessed for their effectiveness in the methods of the present invention.

In one exemplary embodiment, the method further comprises stabilization of the first and second droplets prior to fusion of the first and second droplets. In another exemplary embodiment, the method further comprises stabilization of the first and second droplets after fusion.

In one exemplary embodiment, the fusion of the first and second sets of droplets occurs after successive accelerations and decelerations of velocity. In another exemplary embodiment, the first and second sets of drops are fused after successive reorientation and rearrangement in microfluidic channels in space and time. In yet another exemplary embodiment, the first and second sets of droplets are fused after/during the direction of flow is changed. In another exemplary embodiment, the first and second sets of droplets are fused after/during a change in the velocity of the carrier oil stream. In another exemplary embodiment, the first and second sets of droplets are fused after/during a change in the velocity due to changes in cross-section of the micro fluidic channels perpendicular to the direction of the flow. In another exemplary embodiment, the first and second sets of droplets are fused after/during the time when droplets move away from each other prior to coalescence.

In one exemplary embodiment, the first and second drops have a size ranging from 1 to 100 pL. In another exemplary embodiment, the first and second drops have a size ranging from 5 to 25 pL. In yet another exemplary embodiment the first and second drops have a size ranging from 8 to 18 pL.

In one exemplary embodiment, the first and second droplets are produced or re-injected at the same frequency. In another exemplary embodiment, the first set of droplets are produced or re-injected at a lower frequency than the second set of droplets. In another exemplary embodiment, the first set of droplets is produced at a higher frequency than the second set of droplets. In an embodiment, the droplets are produced at frequencies greater than 0.1 Hz. In a particular embodiment, the droplets are produced at frequencies ranging from 1 to 2 kHz. In one exemplary embodiment, the first set of droplets is produce at about 1.55 kHz and the second set of droplets is produced at about 1.88 kHz.

BRIEF DESCRIPTION OF THE DRAWINGS

FIG. 1: Microfluidics devices and operations.

FIG. 2: Schematic representation of the optical set-up. Droplet fluorescence was induced using a 532 nm (25 mW) solid-state laser (Newport-Spectraphysics) guided to the side camera port of the Axiovert 200 inverted microscope (Carl Zeiss SAS) by a series of periscope assemblies (Thorlabs GmbH). Inside the microscope, the laser light was reflected up into a LD Plan Neofluar 40×/0.6 microscope objective (Carl Zeiss SAS) and focused in a channel within the microfluidic device. A Phantom v4.2 high-speed digital camera (Vision Research) was mounted on the top camera port of the microscope to capture digital images during droplet production, fusion and re-injection. A 562/40 BrightLine® bandpass filter (Semrock Inc.) positioned in front of the camera protected the camera's sensor from reflected laser light. Light emitted from fluorescing droplets was captured by the objective and channeled back along the path of the laser into the system of periscope assemblies. The emitted light was separated from the laser beam by a 488/532/638 nm-wavelength transmitting dichroic beam splitter (Semrock Inc.), and filtered through a notch (NF01-532U-25) and bandpass (FF01-617/73-25; Semrock Inc.) filter for detection on an H5784-20 photomultiplier tube (PMT, Hamamatsu Photonics KK). The signal output from the PMT was analysed using a PCI-7831R Multifunction Intelligent DAQ card (National Instruments Corporation) executing a program written in LabView 8.2 (FPGA module, National Instruments Corporation) which allowed the identification of droplets by peaks in fluorescence, as well as the width of each droplet. The data acquisition rate for the system was 100 kHz.

FIG. 3: Droplet production in the presence and absence of surfactant. FIG. 3A. Light micrograph of droplet production when the carrier oil contained 0.05% EA-surfactant. FIG. 3B. Light micrograph of droplet production when the carrier oil was without surfactant. FIG. 3C. Light micrograph showing droplet coalescence in the stability measurement chamber when the carrier oil contained 0.55% EA-surfactant. Scale bar 100 µm.

FIG. 4: Droplet pairs fusion within the coalescence region. The re-injected droplets are black due to Methylene Blue dye, droplets generated on-chip are clear. The dotted line circles show the fusion steps of two droplets. Grey arrows indicate the path of a re-injected droplet that avoids undesirable coalescence (i.e. coalescence with another already fused droplet) even if the droplet was in physical contact with fused droplet. The black arrow indicates the direction of the flow. FC40 fluorinated oil used to create droplets on-chip and space re-injected droplets contained 0.55% EA-surfactant. Stabilization oil contained 2.8% EA-surfactant.

FIG. 5: Droplet stability measurements on-chip. The re-injected droplets appear black due to Methylene Blue dye, droplets generated on-chip are clear and fused droplets are grey. In all examples carrier oil used to create droplets on-chip and to space re-injected emulsion contained 0.55% EA-surfactant. FIG. 5A. No stabilization oil. FIG. 5B. Stabilization oil containing 2.8% EA-surfactant. FIG. 5C. Stabilization oil containing 0.55% EA-surfactant. Scale bar 100 µm.

FIG. 8: Passive size-dependent fractionation of complex droplet mixtures.

FIG. 9: Separation analysis. Separation efficiency as a function of the ratio of smaller droplets to larger droplets (n). Separation efficiency is defined as the percentage of smaller droplets separated. The volumes of the larger droplets are given in the legend. The smaller droplets were 3 pL. The spacing factor (λ) was ~120 µm. (Inset) Separation efficiency [%] as a function of droplet spacing factor λ (µm), when smaller droplets were 3 pL and larger droplets were 10 pL.

FIG. 10: Operation and analysis of the integrated microfluidic chip. FIGS. 10A and 10B. Light micrograph of the integrated microfluidic chip showing spacing of preformed droplets pairs, selective droplet fusion and passive droplet separation. Fused, reinjected and on-chip generated droplets are 15 pL (gray), 3 pL (black) and 12 pL (clear), respectively. The black arrows indicate the direction of the flow. Scale bars 100 µm. FIG. 10C. Quantitative analysis of fused and separated droplets. 2-D contour plots representing droplet populations after passive droplet fusion, before (left) and after (right) size fractionation. For each experiment ~$10^5$ droplets were analyzed. Reinjected droplets were 3 pL and contained 50 µM fluorescein (Green fluorescence). The droplets produced on-chip were 10 pL and contained 100 µM resorufin (Orange fluorescence). The numbers inside the contour plots correspond to populations of unfused droplets produced on-chip (1), one reinjected droplet fused to one droplet produced on-chip (2), unfused reinjected droplets (3) and uncontrolled coalescence during off-chip incubation and manipulations (4). The percentage of droplets in each population is given in brackets. The bars correspond to the number of droplets on a logarithmic scale.

FIG. 14: Schematics and design of the microfluidic device.

FIG. 16: Selective droplet coalescence in multiple droplet clusters.

FIG. 17: Droplet coalescence angle (θ) and distance (d) in multiple droplet clusters. Droplets generated on-chip were 25 pL ($R_2$=18.5 µm) and emulsion droplets were 15 pL ($R_1$=15.5 µm). Independent on the number of emulsion droplets introduced into the micro fluidic device (FIG. 14) only pairwise droplet coalescence events were obtained. In all cases observed coalescence angle θ varied significantly while the distance d stayed the same d~41 µm. For representative reasons only seven coalescence events are presented. θ and d values corresponding to the same coalescence event are indicated in the same colour.

FIG. 18: Selective coalescence of 10 pL emulsion droplets within multiple droplet clusters. Emulsion (surfactant-stabilized) droplets are black and droplets generated on-chip are clear. Droplets generated on-chip were 25 pL ($R_2$=18.5 µm) and emulsion droplets were 10 pL ($R_1$=13.5 µm). Continuous phase was FC40 oil with 2% EA-surfactant. All coalescence events observed were solely one-to-one; one emulsion droplet coalesced to one droplet generated on-chip. Grey arrows indicate coalescence event in which one surfactant-stabilized droplet fuses to one droplet generated on-chip. Black arrow indicates direction of the flow. Scale bar 50 µm. The time gap between images is given inside grey boxes.

FIG. 19: Selective coalescence of 20 pL emulsion droplets within multiple droplet clusters. Emulsion droplets are black and droplets generated on-chip are clear. FIG. 19A. Droplet coalescence corresponding to symmetric case when $R_1=R_2=17$ μm. FIG. 19B. Droplet coalescence corresponding to asymmetric case when $R_1>R_2$; $R_1=17$ μm and $R_2=15.7$ μm. FIG. 19C. Droplet coalescence corresponding to asymmetric case when $R_1<R_2$; $R_1=17$ μm and $R_2=48.5$ μm. Grey arrows indicate coalescence event in which one surfactant-stabilized droplet fuses to one droplet generated on-chip. Black arrows indicate direction of the flow. Scale bars 50 μm. The time gap between images is given inside grey boxes.

DETAILED DESCRIPTION OF THE INVENTION

Figure 1A:
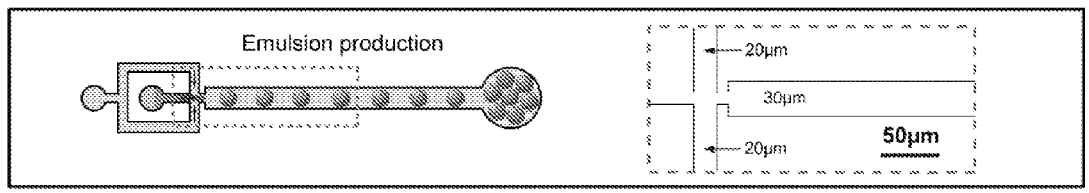
FIG. 1A. Schematic of the droplet generation device. The device contained one oil and one aqueous inlet. Droplets were generated at a flow-focussing junction using FC40 containing 4% (w/w) EA-surfactant. Droplets were stabilized by the surfactant in a 1500 µm long and 30 µm wide channel. The depth of the channels was 10 µm. The red box indicates the area around the nozzle with dimensions in µm.

The present invention firstly provides a method for fusing droplets in a chip comprising (i) providing a first set of droplets which are partially or not stabilized by surfactant, (ii) providing a second set of droplets which are stabilized by surfactant, (iii) contacting each droplet of the first set with single or multiple droplets of the second set in a pairing module and (iv) fusing droplets of the first set with droplets of the second set through a droplet fusion module in which the droplets experience at least one acceleration and/or deceleration and/or reorientation and/or rearrangement in space and time. Preferably, in the fusion module, droplets experience successive accelerations and decelerations and/or successive reorientations and/or rearrangements in space and time.

The chip may be a microfluidic chip, a nano fluidic chip, a picofluidic chip or a macro fluidic chip. Preferably the chip is a micro fluidic chip The term "microfluidic chip", as used herein, refers to a device, or chip, of only millimeters to a few square centimeters or tens of centimeters in size dealing with the handling of extremely small fluid volumes down to less than picoliters. Microfluidic chips are usually fabricated by using lithography-based technologies such as soft lithography.

The first and/or the second set of droplets may be generated on the chip used for the droplet fusion ("on-chip") or on another system.

The first and/or the second set of droplets may be collected in the form of an emulsion outside the chip ("off-chip").

In an embodiment, the first and/or the second set of droplets are generated on the chip used for the fusion. This production is carried out in an on-chip droplet generation module. In a particular embodiment, this droplet generation module comprises a flow-focusing junction (as illustrated in the dotted line box of FIG. 1A) or a T-junction (Abate, Poitzsch et al. 2009) allowing the production of droplets of different size. The droplet size is controlled by adjusting the flow rates of aqueous phase and carrier oil. This method to produce droplets is well known by the skilled person and has been previously described (Christopher and Anna, 2007; Thorsen, Roberts et al. 2001; Garstecki, Stone et al. 2005; Garstecki, Fuerstman et al. 2006).

In another embodiment, the first and/or the second set of droplets are generated on another system before to be re-injected on the chip used for the droplet fusion. In a particular embodiment, the droplets are generated on a droplet generation module on another or the same chip and are then re-injected on the chip used for the droplet fusion through an emulsion re-injection module. Typically, droplets may be re-injected through an emulsion re-injection module comprising a ψ-shaped structure where injected droplets are spaced by carrier oil supplying by at least one, preferably two side channels connected with the re-injection channel. The carrier oil supplying to space injected droplets may or not contain surfactant. Preferably, the carrier oil used to space injected droplets contains the same concentration of surfactant as the carrier oil used to generate the first set of droplets.

In a particular embodiment, the first and second sets of droplets are generated in droplet generation modules on the chip used for the fusion.

In another particular embodiment, the first and second sets of droplets are generated in droplet generation modules on a separate device and/or collected "off-chip" before to be re-injected on the chip used for the fusion, typically through an emulsion re-injection module.

In another particular embodiment, the first set of droplets is generated in an on-chip droplet generation module and the second set of droplets is generated on a separate device and/or collected "off-chip" before being re-injected on the chip used for the fusion, typically through an emulsion re-injection module as described above.

In the method of the invention, droplets may be provided by a droplet generation module or by an emulsion re-injection module.

In an embodiment, the droplets of the first and second sets are provided at a frequency ranging from 0.01 Hz to 10 kHz, preferably from 0.1 kHz to 5 kHz, more preferably from 0.5 kHz to 2.5 kHz. A frequency of 1 kHz means that droplets are provided at a rate of 1000 droplets per second. Droplets of the first and second sets may be provided at the same frequency or at different frequencies. Preferably, the first set of droplets is provided at a lower frequency than the second set of droplets. These frequencies may be easily chosen by the skilled person. In particular, the skilled person knows how to adjust these frequencies in order to obtain a contact of each droplet of the first set with a specified number of droplets of the second set in the pairing module. In a particular embodiment, the first set of droplets is provided at a frequency of about 1.55 kHz and the second set of droplets is provided at a frequency of about 1.8 kHz.

As used in this specification, the term "about" refers to a range of values±10% of the specified value. For example, "about 20" includes ±10% of 20, or from 18 to 22. Preferably, the term "about" refers to a range of values ±5% of the specified value.

In an embodiment, the droplets of the second set are provided with a ratio superior to 1 to the droplets of the first set, preferably at a ratio ranging from 10:1 to 1:1, more preferably a ratio ranging from 5:1 to 1.2:1. The ratio of droplets of the second set to droplets of the first set may be easily chosen by the skilled person in order to adjust the number of droplets of the second set which are intended to fuse with each droplet of the first set. For example, if three droplets of the second set have to be fused with each droplet of the first set, the ratio should be about 3:1. If one-to-one fusions are intended, the ratio should be about 1:1. Preferably, the ratio is slightly higher than the ratio to be fused, for instance 10 to 30% more and in particular 20% more. Accordingly, for instance, if three droplets of the second set have to be fused with one droplet of the first set, the ration may be about 3.6:1.

In an embodiment, the droplets of the first set have a volume ranging from 1 pL to 1000 nL, preferably from 2 pL to 100 nL, more preferably from 3 pL to 1 nL, even more preferably from 8 pL to 100 pL, and the most preferably from 8 pL to 20 pL. In a particular embodiment, the droplets of the first set have a volume of 9 pL. In an embodiment, the droplets of the second set have a volume ranging from 1 pL to 1000 nL, preferably from 2 pL to 10 nL, more preferably from 2 pL to 1 nL, even more preferably from 3 pL to 100 pL, and the most preferably from 3 pL to 25 pL. In a particular embodiment, the droplets of the second set have a volume of 3 pL. Droplets of the first set may have the same or a different volume than droplets of the second set. In a particular embodiment, droplets of the first set and of the second set have the same volume. In another particular embodiment, droplets of the first set have a smaller volume than droplets of the second set. In a preferred embodiment, droplets of the first set have a larger volume than droplets of the second set.

The droplets of the second set are stabilized by surfactant. As used herein, the term "stabilized by surfactant" or "surfactant-stabilized droplet" refers to droplets with sufficient surfactant at the interface to avoid significant droplet coalescence on the timescale of the experiment. This term refers to droplets that can be collected in the form of an emulsion, in which fraction of the dispersed phase is greater than 20%, and in which less than 10% of droplets coalesce over 24 hours. Different methods known by the skilled person can be used to measure the percentage of droplet coalescence (for instance, methods disclosed in Sjöblom, 2006). One of the most straightforward of these methods is the observation of the emulsion under the microscope. The interface of surfactant-stabilized droplets is typically saturated or almost saturated with surfactant (typically more than 30% of maximum saturation with surfactant molecules). In an embodiment, the interfacial tension ($\gamma$) of droplets of the second set during the time these droplets enter the fusion module is in the range of 15 mN/m to 1 mN/m, preferably from 8 mN/m to 2 mN/m, more preferably is about 5 mM/m.

The droplets of the first set are partially stabilized by surfactant or are not stabilized by surfactant. As used herein, the term "not fully stabilized by surfactant" or "partially stabilized by surfactant" refers to droplets with interface not saturated with surfactant molecules and/or that allows droplet coalescence to occur on the timescale of the experiment. In particular, this term refers to droplets which can coalesce with "surfactant-stabilized droplet", as defined above, when brought in contact for 1 ms to 10 min. Surfactant molecules provide a decrease in the droplet surface tension. In a preferred embodiment, the interfacial tension ($\gamma$) of droplets of the first set during the time these droplets enter the fusion module is in the range of 100 mN/m to 15 mN/m, preferably from 60 mN/m to 20 mN/m, more preferably from 45 mN/m to 35 mN/m, and even more preferably is about 40 mM/m.

As used herein, the term "not stabilized by surfactant" refers to droplets with interface free of any molecule of surfactant. These droplets can coalesce with "surfactant-stabilized droplet", as defined above, when brought in contact for less than 1 ms. These non stabilized droplets may be produced as described in the article of Bremond et al., 2008.

In a preferred embodiment, droplets of the first set are partially stabilized by surfactant.

The droplets comprise a dispersed phase (for example, an aqueous solution) in a continuous immiscible phase. The interfacial tension of droplets depends on the composition of the dispersed phase, the nature of the continuous phase and the concentration and type of surfactant.

The amount of surfactant molecules at the interface of the droplet is mainly controlled by the concentration of surfactant dissolved in the continuous phase (carrier oil) and/or by the concentration of surfactant in the dispersed phase and/or incubation time during which surfactant molecules are given enough time to diffuse from continuous and/or dispersed phase onto the interface. Preferably, the amount of surfactant molecules at the interface of the droplet is controlled by the concentration of surfactant in the continuous phase.

In an embodiment, the carrier oil used to generate the first set of droplets comprises a concentration of surfactant in the range of 0.0001% to 5% (w/w), preferably in the range of 0.05% to 2.8% (w/w), more preferably in the range of 0.11% to 1.11% (w/w), and even more preferably in the range of 0.27% to 0.55% (w/w). In a particular embodiment, the carrier oil used to generate the first set of droplets comprises about 0.55% (w/w) of surfactant.

In a particular embodiment, the carrier oil used to generate the first set of droplets is a fluorinated oil and comprises as a surfactant, a PFPE-PEG-PFPE (perfluoropolyether-polyethylene glycol-perfluoropolyether) tri-block copolymer such as EA-surfactant, said surfactant being present in the carrier oil at a concentration ranging from 0.05% to 2.8% (w/w), preferably ranging from 0.11% to 1.11% (w/w), more preferably ranging from 0.27% to 0.55% (w/w), and even more preferably at a concentration of about 0.55% (w/w).

In an embodiment, the carrier oil used to generate the second set of droplets comprises a concentration of surfactant greater than 0.001% (w/w), preferably greater than 0.1% (w/w), more preferably greater than 1% (w/w), even more preferably greater than 2% (w/w), and the most preferably greater than 4% (w/w). In a particular embodiment, the carrier oil used to generate the second set of droplets comprises about 4% (w/w) of surfactant. Preferably, the concentration of surfactant in the carrier oil used to generate the second set of droplets is in the range of 2% (w/w) to 10% (w/w), more preferably from 4% (w/w) to 8% (w/w).

In a particular embodiment, the carrier oil used to generate the second set of droplets is a fluorinated oil and comprises as a surfactant, a PFPE-PEG-PFPE tri-block copolymer such as EA-surfactant, said surfactant being present in the carrier oil at a concentration greater than 2.8%, preferably at a concentration greater than 4% (w/w), and more preferably at a concentration of about 4% (w/w).

The method of the present invention is not limited by the type of surfactant or carrier oil used. The type of surfactant to be used will depend on the surfactant's effectiveness in facilitating fusion of the first and second sets of droplets, as well as the surfactant's effectiveness in stabilizing the interface of droplets, as well as the surfactant's compatibility with any reactants contained within the first and second droplet pairs. One of ordinary skill in the art will be able to select the appropriate surfactant, dispersed phase and carrier oil based on the desired properties of the droplets and reaction conditions used.

Surfactants, also named emulsifying agents, act at the water/oil interface to prevent (or at least to decay) separation of the phases. Many oils and surfactants (emulsifiers) can be used for the generation of the first and second sets of droplets (Ash and Ash 1997).

The first and second sets of droplets may contain the same surfactant or different surfactants. In a particular embodiment, the first and second sets of droplets contain the same surfactant. In an embodiment, the surfactant contains hydrophobic tail and hydrophilic head group. In another embodiment, the surfactant contains polymer-based tail and hydrophilic head group. In another embodiment, the surfactant contains polymer-based tail and polymer-based head group. In another embodiment, the surfactant contains fluorinated tail and hydrophilic head group. In another embodiment, the surfactant contains fluorinated polymer-based tail and hydrophilic polymer-based head group. In another embodiment, the surfactant is a sort of di-block copolymer or tri-block copolymer type. In a particular embodiment, the surfactant is a block copolymer and more specifically a tri-block copolymer consisting of two perfluoropolyether blocks and one poly(ethylene)glycol block. Various block copolymer surfactants are described in the article of Wanka, Hoffmann et al., 1994. In a more particular embodiment, the surfactant is selected from the group consisting of the tri-block copolymer EA-surfactant (RainDance Technologies) and DMP (dimorpholino phosphate)-surfactant (Baret, Kleinschmidt, et al., 2009). In a preferred embodiment, the surfactant is EA-surfactant.

The carrier oil used to generate the first and the second set of droplets may be different or identical. Preferably, the same carrier oil is used to generate the two sets of droplets. In an embodiment, the carrier oil is selected from the group consisting of fluorinated oil such as FC40 oil (3M®), FC43 (3M®), FC77 oil (3M®), FC72 (3M®), FC84 (3M®), FC70 (3M®), HFE-7500 (3M®), HFE-7100 (3M®), perfluorohexane, perfluorooctane, perfluorodecane, Galden-HT135 oil (Solvay Solexis), Galden-HT170 oil (Solvay Solexis), Galden-HT110 oil (Solvay Solexis), Galden-HT90 oil (Solvay Solexis), Galden-HT70 oil (Solvay Solexis), Galden PFPE liquids, Galden® SV Fluids or H-Galden® ZV Fluids; and hydrocarbon oils such as Mineral oils, Light mineral oil, Adepsine oil, Albolene, Cable oil, Baby Oil, Drakeol, Electrical Insulating Oil, Heat-treating oil, Hydraulic oil, Lignite oil, Liquid paraffin, Mineral Seal Oil, Paraffin oil, Petroleum, Technical oil, White oil, Silicone oils or Vegetable oils. In a particular embodiment, the carrier oil is a fluorinated oil. In a more particular embodiment, the carrier oil is selected from the group consisting of FC40 oil, Galden-HT135 oil, HFE-7500 and FC77 oil.

In a particular embodiment, the carrier oil used to generate the first and the second set of droplets is a fluorinated oil and the surfactant is a tri-block copolymer. In a more particular embodiment, the carrier oil used to generate the first and the second set of droplets is selected from the group consisting of FC40 oil, Galden-HT135 oil, HFE-7500 and FC77 oil and the surfactant is EA-surfactant. In a very particular embodiment, the carrier oil used to generate the first and the second set of droplets is FC40 oil and the surfactant is EA-surfactant.

In step (iii) of the method of the invention, provided droplets of the first and second sets are brought into contact in a droplet pairing module before fusing.

In an embodiment, each droplet of the first set is brought into contact with single droplets of the second set. In another embodiment, each droplet of the first set is brought into contact with multiple droplets of the second set. In a particular embodiment, each droplet of the first set is brought into contact with two droplets of the second set. In a another particular embodiment, each droplet of the first set is brought into contact with three droplets of the second set As used herein, the term "droplet pair" refers to a droplet of the first set and one or several droplets of the second set which are brought into contact with said droplet of the first set. For example, this term may thus refers to one droplet of the first set and one droplet of the second set, or one droplet of the first set and two or three droplets of the second set.

In the method of the invention, the droplet-pairing module is a channel with dimensions allowing the contact between droplets of the two sets.

In an embodiment, the depth of this channel is in the range of 10% greater and 50% lower than the diameter of the larger droplets.

In another embodiment, the width of this channel is in the range of 10% greater and 50% lower than the diameter of the larger droplets.

In another embodiment, the width of the channel is about the diameter of the larger droplets and the depth of the channel is lower than the diameter of the larger droplets.

In another embodiment, the depth of the channel is in the range of 10 to 50% lower than the diameter of the larger droplets and the width of the channel is in the range of about the diameter of the larger droplets and 10% greater than this diameter.

In another embodiment, the width of the channel is in the range of 10 to 50% lower than the diameter of the larger droplets and the depth of the channel is in the range of about the diameter of the larger droplets and 10% greater of this diameter.

In a preferred embodiment, the width of the pairing channel is about 10% greater than the diameter of the larger droplets and the depth is about 45% lower than the diameter of the larger droplets.

In a particular embodiment, the droplets of the first set are larger than the droplet of the second set, the width of the channel is about the diameter of the droplets of the first set and the depth of the channel is about 45% lower than the diameter of the droplets of the first set.

In a more particular embodiment, the pairing channel is about 40 μm wide and 20 μm deep.

In an embodiment the length of the pairing channel is sufficient to obtain a contact between droplets of the first set and the second set. In an preferred embodiment the time of contact is greater than 1 ms, preferably greater than 4 ms, more preferably greater than 6 ms, and even more preferably greater than 8 ms. As used herein, "the contact time τ" refers to the time in which paired droplets stay in physical contact before reaching the end of the pairing channel. The optimal contact time for each embodiment can be determined by routine work, as disclosed in example 3 and FIG. 16A. This optimal contact time will depend on the type and the concentration of surfactant, the type of carrier oil and the nature of the dispersed phase.

In a particular embodiment, the length of the pairing channel is ranging from 100 µm to 10 mm, preferably from 500 µm to 2 mm, and more preferably is about 1.5 mm.

In an embodiment, droplet pairs are formed in a droplet-pairing module comprising a channel with a width ranging from 10 µm to 10 mm, preferably from 20 to 100 µm, and a length ranging from 100 µm to 10 mm, preferably from 500 µm to 2 mm, and a depth ranging from 10 µm to 10 mm, preferably from 20 to 100 µm.

In a preferred embodiment, the pairing-droplet module comprising a channel of about 40 µm wide and about 1.5 mm length and 20 µm deep.

The number of droplets of the second set in contact with each droplet of the first set may be adjusted by modifying the cross sectional area of the pairing channel, modifying the frequency of generation or re-injection of the droplets of the second set, modifying the ratio of droplets of the second set to droplets of the first set, or modifying the size of the droplets (for instance, in more droplets of the second set are intended to be fused with each droplet of the first set, the size of the droplets of the first set may be increased and/or the size of the droplets of the second set may be decreased).

Figure 11:
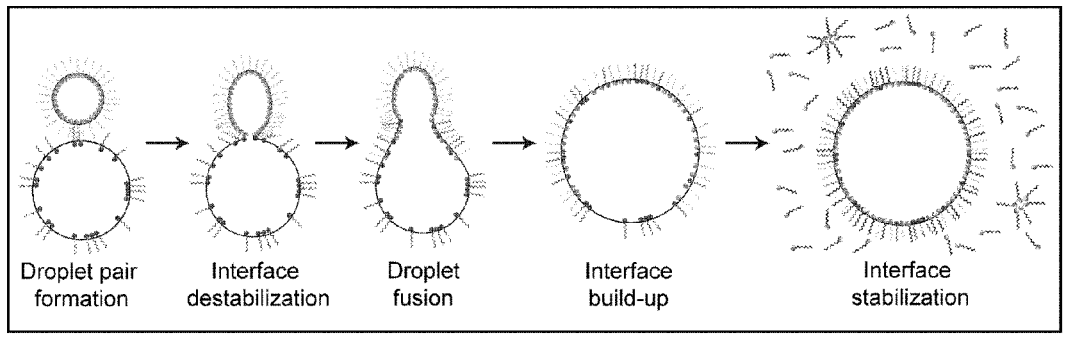
FIG. 11: Model of the droplet fusion. A droplet pair comprising a droplet stabilized by surfactant (upper droplet) and a droplet partially stabilized by surfactant (lower droplet) is formed. The geometry of the droplet fusion module induces droplet interface destabilization leading to coalescence. Optionally, the interface of the fused droplet is further stabilized by additional surfactant molecules provided by the stabilization oil injected in the system just before the fusion or after the fusion.

In the method of the invention, the droplet fusion step is a passive mechanism. In particular, it does not require electrical fields, lasers, special treatment of fluidic channel nor accurate droplet synchronization. The coalescence of droplets is obtained by creating small disturbances in the flow pattern leading to droplet interface destabilization. A model of the droplet fusion is presented in FIG. 11. In an embodiment, the coalescence of droplets is obtained in a droplet fusion module in which the droplets experience at least one acceleration and/or deceleration and/or reorientation and/or rearrangement in space and time. Preferably, in the fusion module, droplets experience successive accelerations and decelerations and/or successive reorientations and/or rearrangements in space and time. In particular, the droplet fusion may be obtained by changing the velocity of the flow and/or the direction of the flow. In an embodiment, the droplet fusion module comprises a channel with a geometry inducing at least one acceleration and/or deceleration and/or reorientation and/or rearrangement in space and time. In another embodiment, the droplet fusion module comprises a channel with a geometry inducing successive droplet accelerations and decelerations and/or successive droplet reorientations and/or rearrangements in space and time. The reorientation and rearrangement of droplets in space and time may be induced by a geometry inducing droplet motion away from each other. In this case, the coalescence is induced by a slight increase of the distance between the two centres of mass of the droplets to be fused whereas they stay in contact. This stretched conformation leads to the coalescence of droplets.

Figure 14A:
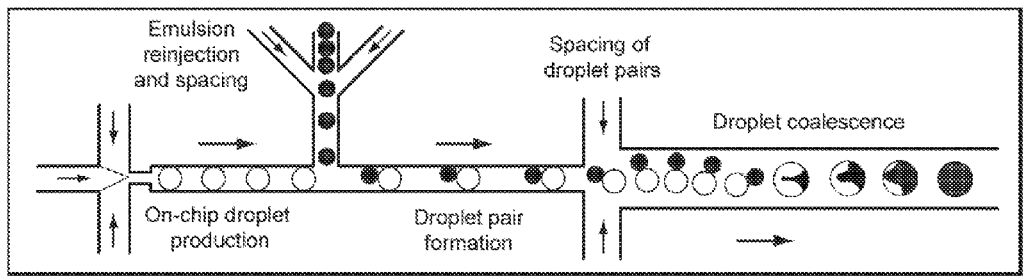
FIG. 14A. Schematics and operation of the microfluidic system showing the main steps including: droplet generation on-chip (white circles), emulsion reinjection (black circles), droplet pair formation, spacing of droplet pairs, sliding and droplet coalescence. Black arrows indicate the direction of the flow.
Figure 15A:
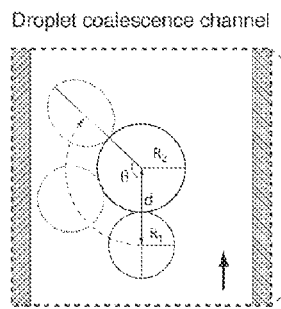
FIG. 15A. Droplet coalescence channel. Inside the coalescence channel, surfactant stabilized droplet ($R_1$) slides over the surface (dashed arrow) of surfactant-deficient droplet ($R_2$) until the position where it becomes pulled apart by the hydrodynamic flow leading to coalescence.
Figure 15B:
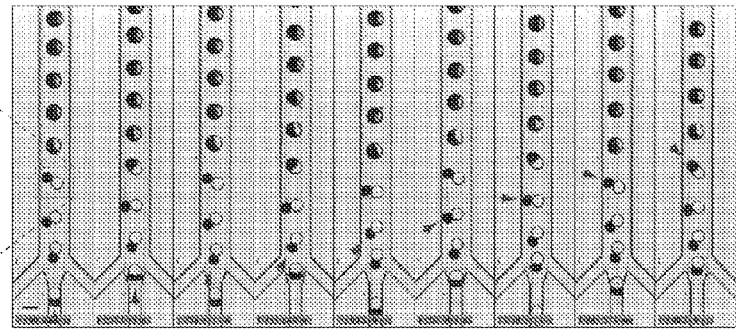
FIG. 15B. Time sequence of flow-induced droplet coalescence. Emulsion droplets are black and on-chip generated droplets are white. Scale bar 50 µm.
Figure 15C:
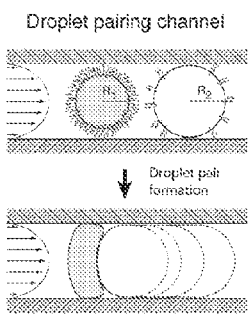
FIG. 15C. Formation of a droplet pair. Emulsion droplet ($R_1$) having a saturated interface flows faster inside microfluidic channel due to lubrication and therefore is pushed by the laminar flow into the back-side of the on-chip droplet ($R_2$), which is not completely stabilized by the surfactant. Surfactant molecules indicated are not in scale. Since on-chip droplets become pinched inside pairing channel the contact area accessible for pair formation remains the same independent of droplet size (dashed arcs). Due reduced interfacial tension surfactant-stabilized droplets are deformed by the flow in the pairing channel FIG. 15D. Coalescence angle θ and distance d over the time during coalescence event from panel c at $Q_{cc}$=250 µL/hr.
Figure 15D:
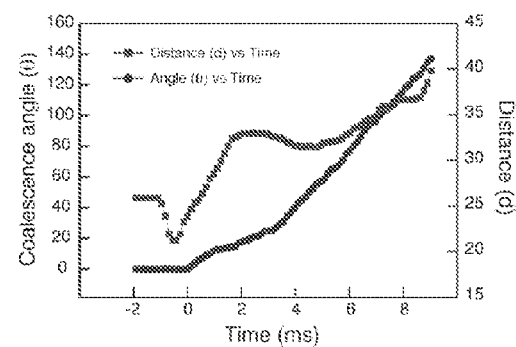
FIG. 15: Flow-induced droplet coalescence inside microfluidic channel.
FIG. 15E. θ and d plots vs. time, when $Q_{cc}$ was varied from 0 to 360 µL/hr. θ was independent of the $Q_{cc}$ but d was always the same, 42±1.5 µm. θ and d values corresponding to the same coalescence event are indicated in the same colour.

In a first embodiment, the droplet fusion module comprises a channel with a cross section which is sufficient to allow droplets of the second set which are paired with droplets of the first set to slide over the surface of droplets of the first set until a position where droplets are pulled apart by the hydrodynamic flow leading to coalescence. Such an embodiment is illustrated in FIGS. 14A and 15B. The cross sectional area perpendicular to the direction of the flow may remain the same along the length of the coalescence channel or may vary along its length. In particular, the channel of the fusion module may be at least two times larger than the channel of the pairing module. The coalescence channel may have a width ranging from 10 µm to 10 mm, preferably from 50 µm to 100 µm, a depth ranging from 10 µm to 1 mm, preferably from 20 µm and 100 µm and a length ranging from 10 µm to 10 mm, preferably from 100 µm to 1 mm. In particular, the coalescence channel may be about 100 µm wide, about 20 µm deep and about 1 mm long. More particularly, the pairing channel may be about 40 µm wide, about 20 µm deep and about 1.5 mm long and the coalescence channel is about 100 µm wide, about 20 µm deep and about 1 mm long. The droplet fusion module may comprise a channel in which the cross-sectional area perpendicular to the direction of the flow varies along its length. In particular, the channel of the droplet fusion module may comprise at least two portions with cross-sectional areas perpendicular to the direction of the flow which differ of at least 10%, preferably of at least 20%, and more preferably of at least 30%.

Figure 20:
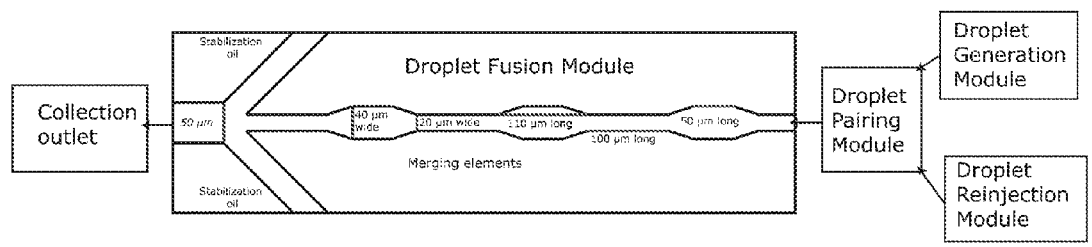
FIG. 20: A system for fusing of surfactant-stabilized droplets with droplets that are partially stabilized by surfactant. Boxes indicate different microfluidic modules and the geometry of the droplet fusion module is given in more details.
Figure 21:
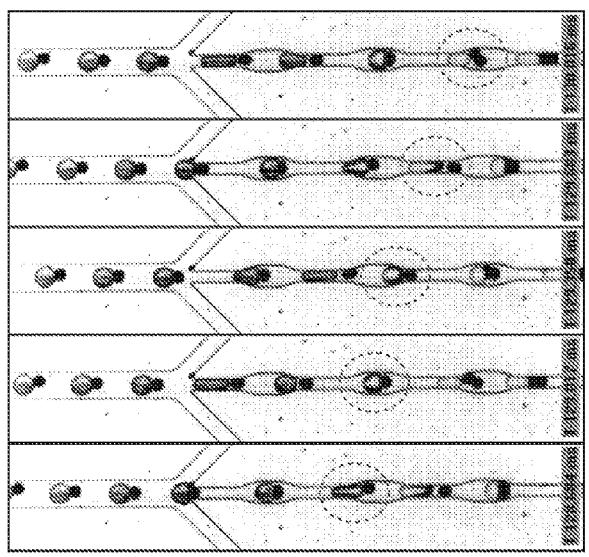
FIG. 21: Droplets coalescence inside droplet fusion module. Light micrographs of the droplet fusion module showing one-to-one fusion of surfactant-stabilized droplets (black) with droplets that are partially stabilized by surfactant (clear). Time scale between images is given in grey boxes. Dashed circle indicates fusion event in which single surfactant-stabilized droplets fused to a single droplet generated on-chip (partially stabilized by surfactant). Direction of the flow is from right to left.

In a second embodiment, the droplet fusion module comprises a channel with a expansion(s) and constriction(s) geometry in which the cross-sectional area perpendicular to the direction of the flow varies along its length, as illustrated in FIGS. 20 and 21. The expansion(s) and constriction(s) induce a distribution of speeds of the continuous phase in the direction of the flow and/or produce a series of accelerations and decelerations of the droplets and/or reorientations and/or rearrangements in space and time. In particular, the droplet fusion module may comprise a channel with a geometry comprising at least one expansion portion and at least one constriction portion, said at least one expansion portion having a width ranging from 10 µm to 10 mm, preferably from 40 µm to 100 µm, said at least one constriction portion having a width ranging from 10 µm to 9 mm, preferably from 20 µm to 50 µm, each expansion or constriction portion having a length ranging from 10 µm to 10 mm, preferably from 100 µm to 1 mm, and having a depth ranging from 10 µm to 1 mm, preferably from 20 µm and 100 µm. Of course, the width of the expansion portion is larger than the width of the constriction portion. More particularly, the droplet fusion module may comprise a channel with an expansion and constriction geometry, said channel comprising expansion portions of about 40 µm wide and about 110 µm long and constriction portions of about 20 µm wide and about 100 µm long, with a depth of 20 µm. Such an embodiment is illustrated in FIG. 20.

In a third embodiment, the droplet fusion module comprises a channel with a zigzag geometry. Accordingly, the droplet fusion module may be a channel with a zigzag geometry. In particular, the droplet fusion module may comprise a zigzag channel in which the cross-sectional area perpendicular to the direction of the flow varies along its length.

The zigzag geometry induces a distribution of speeds of the continuous phase in the direction of the flow and produces a series of accelerations and decelerations of the droplets. As used herein, the term "zigzag geometry" may refers to (i) straight segmented channels directly connected at angles ranging from 45° to 170°, preferably from 90° to 135°, and more preferably from 100° to 120°; (ii) straight segmented channels connected at angles ranging from 45° to 170°, preferably from 90° to 135°, and more preferably from 100° to 120°, by curved channel segments; (iii) straight segmented channels connected at angles ranging from 20° to 170°, preferably from 90° to 135°, and more preferably from 100° to 120°, by straight channel segments with a different width, and (vi) curved segmented channels directly connected to produce a serpentine channel. For illustration, segmented channels of FIG. 1B are connected at an angle of 117°. The pattern of the zigzag geometry may be regular or irregular. Such zigzag geometry is illustrated in FIG. 1B (in particular in the dotted line boxes of this figure), 22 and 23.

In particular, the channel with a zigzag geometry may comprise segmented channels with a width ranging from 10 µm to 10 mm, preferably from 40 to 100 µm, and a length ranging from 10 µm to 10 mm, preferably from 100 µm to 1 mm, connected at an angle ranging from 45° to 170°, preferably from 90° to 135°, and more preferably from 100° to 120°, by sections with a width ranging from 10 µm to 10 mm, preferably from 40 µm to 100 µm, and with a depth ranging from 10 µm to 10 mm, preferably from 10 µm to 100 µm. Preferably, the channel with a zigzag geometry comprises 50 µm wide and 140 µm long segmented channels connected at an angle of 117° by 40 µm wide sections, with a depth of 20 µm.

Figure 14B:
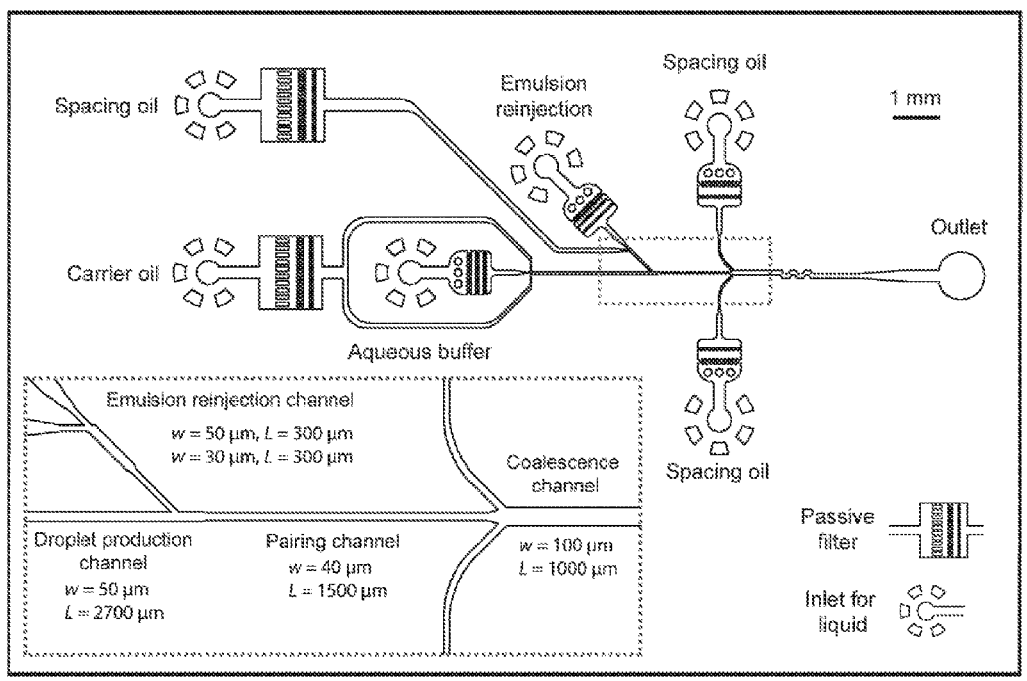
FIG. 14B. Design of the droplet coalescence device. Individual microfluidic modules are indicated. Bottom dotted line square indicates channels used for emulsion reinjection, droplet production on-chip, droplet pair formation and coalescence. The dimensions of each channel are given in µm, where w is width and L is length of the channel. All channels were 20 µm deep.

The droplet fusion module may comprise only one type of fusion channel or several types. In particular, fusion channels with different geometries may be used one after the other. For instance, a zigzag channel can be placed downstream to a straight coalescence channel as illustrated in FIG. 14B.

The channel of the fusion module according to the invention does not consist in a linear channel with the same cross-sectional area perpendicular to the direction of the flow than the channel of the pairing module.

In a preferred embodiment, the depth of all channels on the chip is the same.

In the method of the invention, during or after the fusion, surfactant molecules from surfactant-stabilized droplets diffuse into the interface of newly formed interface and prevent further coalescence events involving the fused droplets.

The aqueous solution (dispersed phase) within the first set of droplets and within the second set of droplets may be identical or may have different compositions. Preferably, the aqueous solutions contained in the first set and in the second set of droplets have different compositions. Aqueous solutions within the droplets may comprise, for instance, various chemical compounds such as buffers, salts, carbohydrates, lipids, polymers, proteins, nucleic acids; particles; cells or micro-organisms. The fusion of droplets of the first set with droplets of the second set induces the mix of the aqueous solutions contained in each set of droplets. The fusion of droplets, i.e. the mix of the aqueous solutions, may be used to initiate, terminate or modify a chemical or biological reaction or test.

In a particular embodiment, the method of the invention further comprises stabilizing fused droplets by adding surfactant just before or after the fusion. Additional surfactant may be provided by adding a stabilization oil comprising surfactant through a droplet stabilization module. Stabilizing fused droplets may be carried out by adding surfactant after pairing and before the fusion. Alternatively, stabilizing fused droplets may be carried out by adding surfactant after the fusion. In a preferred embodiment, the droplet stabilization module is between the droplet-pairing module and the droplet fusion module. Preferably, the droplet stabilization module comprises at least one, preferably two side channels that branch of on either side of the main channel carrying the droplets, preferably the main channel connecting the pairing module and the fusion module. In a particular embodiment, the stabilization of fused droplets is carried out by adding stabilization oil comprising at least 0.001% (w/w) of surfactant, preferably at least 1% (w/w) of surfactant, more preferably at least 3% (w/w) and even more preferably about 3% (w/w) of surfactant. Preferably, the stabilization oil comprises the same oil than the carrier oil used to generate or re-injected droplets.

In a further embodiment, the method of the invention further comprises collecting fused droplets. Droplets may be collected in an "on-chip" collection module or in an "off-chip" system.

In another embodiment, the method of the invention further comprises sorting droplets after fusion. This sorting step may be carried out in an on-chip or off-chip droplet sorting module. Fused droplets may be sorted based on any of their physical or chemical features. In an embodiment, droplets are sorted based on their optical properties, preferably based on their fluorescence. In another embodiment, this sorting step is a size-dependent separation of droplets which could be used to restore monodispersity. This sorting step may be used to separate fused droplets from unfused droplets of the first and second sets, or to separate fused and unfused droplets of the first set from unfused droplets of the second set.

Droplets may be sorted by passive size-dependent droplet separation using hydrodynamics. This passive size-dependent droplet separation may be carried out in the chip used for the fusion ("on-chip") or in another system ("off-chip"). In this embodiment, this separation may be carried out in a separation module on a chip, said separation module comprising (i) a main channel having a depth smaller than the diameter of the larger droplets and a width larger than the diameter of said larger droplets, and (ii) two channels that branch of on either side of said main channel and having a width larger than the diameter of the smaller droplets and smaller than the diameter of the larger droplets.

Since the diameter of the larger droplets is larger than the depth of the main channel, these droplets are pinched along the vertical axis. On the other hand, the smaller droplets are not constrained by the walls of the main channel and remain spherical. Due to these size differences larger droplets move within the main channel at a lower speed than the smaller droplets and thus restrict the passage of the smaller droplets. However, because the width of the main channel is larger than the diameter of the pinched droplets, the flow alongside the walls is not blocked by these droplets. This hydrodynamic effect causes smaller droplets to flow near the wall of the main channel. Once smaller droplets reach the side channels, the hydrodynamic flow drags them into these channels, allowing efficient separation from larger droplets. Since the larger droplets stay in the centre of the main channel, they are not significantly affected by the hydrodynamic flow moving into the side channels and continue to flow in the main channel to the outlet.

In an embodiment, the main channel has a width ranging from 10 µm to 10 mm, preferably from 40 µm to 1 mm, and the two channels that branch of on either side of said main channel are branched at an angle ranging from 100° to 160°, and have a length ranging from 20 µm to 10 mm, preferably from 100 µm to 1 mm, a width ranging from 20 µm to 10 mm, preferably from 30 µm to 100 µm, and depth ranging from 10 µm to 1 mm, preferably from 10 µm to 100 µm. As illustration, in FIG. 8B, the two channels that branch of on either side of the main channel are branched at an angle of 135°. In a particular embodiment, the main channel is 50 µm wide. In another particular embodiment, the two channels that branch of on either side of said main channel are branched at an angle of 135° with the main channel. In another particular embodiment, the two channels that branch of on either side of said main channel are 140 µm long and 23 µm wide. In a very particular embodiment, the main channel is 50 µm wide, the two channels that branch of on either side of said main channel are branched at an angle of 135° with the main channel and are 140 µm long and 23 µm wide.

The fluidic resistance may be adjusted within channels by expanding the main channel directly after the junction with the two sidearms.

Preferably, smaller droplets to be separated have at least a 2.33-fold difference in volume with larger droplets. Alternatively, smaller droplets to be separated have at least a 1.33-fold difference in diameter with larger droplets.

In a preferred embodiment, larger droplets have a volume smaller than 44 pL.

Figure 8A:
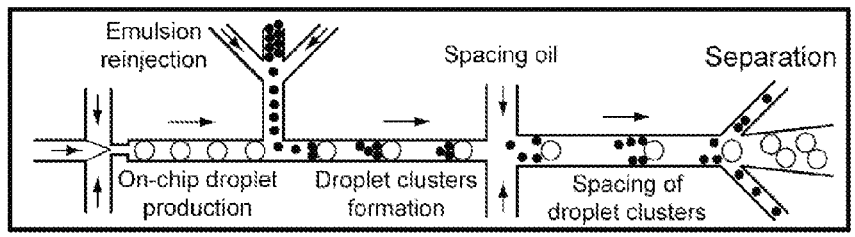
FIG. 8A. Schematic of the device.

Preferably, in the separation module, the distance between the centres of mass of the larger droplets (i.e. the spacing factor λ) is ranging from 1 µm to 1000 µm, preferably from 40 µm to 160 µm, more preferably from 60 µm to 140 µm, and even more preferably is about 120 µm. If necessary, spacing oil can be injected in the main channel through additional side channels in order to space larger droplets before the junction with the two separating sidearms, as presented in FIG. 8A.

In an embodiment droplets of the first set and droplets of the second set are fused one-to-one. In another embodiment, several droplets of the second set are fused with each droplet of the first set. In a particular embodiment, two droplets of the second set are fused with each droplet of the first set. In another particular embodiment, three droplets of the second set are fused with each droplet of the first set.

In a particular embodiment, the method of the invention for fusing droplets in a chip comprises
i) on-chip generating a first set of droplets which are partially or not stabilized by surfactant,
(ii) generating a second set of droplets which are stabilized by surfactant and re-injecting said droplets on the chip,
(iii) pairing droplets of the first set and of the second set,
(iv) adding surfactant or stabilization oil with surfactant (i.e. in order to stabilize fused droplets which will be obtained after step (v))
(v) fusing droplets of the first set with droplets of the second set through a droplet fusion module in which the droplets experience successive accelerations and decelerations and/or successive reorientations and/or rearrangements in space and time,
(vi) optionally sorting droplets, and
(vii) collecting fused droplets.

The present invention further provides a method for conducting a chemical or biological reaction comprising (i) providing a first set of droplets which are partially or not stabilized by surfactant and which contain a first set of reactants, (ii) providing a second set of droplets which are stabilized by surfactant and which contain a second set of reactants, (iii) contacting each droplet of the first set with single or multiple droplets of the second set in a pairing module, and (iv) fusing droplets of the first set with droplets of the second set through a droplet fusion module in which the droplets experience at least one acceleration and/or deceleration and/or reorientation and/or rearrangement in space and time, wherein the droplet fusion is used to initiate, terminate or modify the chemical or biological reaction.

In particular, the method for conducting a chemical or biological reaction comprises performing the method for fusing droplets of the invention wherein the first set of droplets contains a first set of reactants and the second set of droplets contains a second set of reactants and wherein the droplet fusion is used to initiate, terminate or modify the chemical or biological reaction.

All the embodiments of the method for fusing droplets are also contemplated in this method.

In an embodiment droplets of the first set and droplets of the second set are fused one-to-one. In another embodiment, several droplets of the second set are fused with each droplet of the first set. In a particular embodiment, two droplets of the second set are fused with each droplet of the first set. In another particular embodiment, three droplets of the second set are fused with each droplet of the first set.

In an embodiment, the method of the invention further comprises collecting the fused droplets. The product of the reaction can then be isolated from the fused droplets, or the fused droplets can be re-injected for fusion with a third set of droplets containing a third set of reactants. This process can then be repeated as many times as required by the chemical or biological reaction to arrive at the desired final reaction product.

The present invention also provides a method for preparing a monodisperse emulsion on a chip comprising providing at least one set of droplets and sorting droplets by passive size-dependent droplet separation carried out in a separation module comprising (i) a main channel having a depth smaller than the diameter of the larger droplets to be sorted and a width larger than the diameter of said larger droplets, and (ii) two channels that branch of on either side of said main channel and having a width larger than the diameter of the smaller droplets to be sorted and smaller than the diameter of the larger droplets to be sorted. In an embodiment, the method further comprises collecting larger and/or smaller droplets. In an embodiment, the set of droplets comprises droplets of different volumes. In a preferred embodiment, two set of droplets are provided, the first set of droplets comprising larger droplets than the second set and droplets in each set having approximately the same volume.

All the embodiments of the method for fusing droplets are also contemplated in this method.

The present invention also provides a chip suitable for the method for fusing droplets, in particular comprising a droplet fusion module in which the droplets experience at least one acceleration and/or deceleration and/or reorientation and/or rearrangement in space and time. Preferably, the droplets experience in the droplet fusion module successive accelerations and decelerations and/or reorientations and/or rearrangements in space and time. The droplet fusion module is as defined above.

In particular, the droplet fusion module of the chip does not comprise any electrical fields, lasers, special treatment of fluidic channel nor means to obtain accurate droplet synchronization.

The chip of the invention may further comprise:
at least one on-chip droplet generation module as described above; and/or
at least one emulsion re-injection module as described above; and/or
a droplet-pairing module as described above; and/or
at least one stabilization module as described above; and/or
at least one droplet sorting module as described above; and/or
a droplet collection module, as described above.

In particular, the chip of the invention may further comprise an on-chip droplet generation module and an emulsion re-injection module.

In particular, the chip of the invention may further comprise a droplet sorting module which is a passive size-dependent droplet separation module as described above.

In a particular embodiment, the chip of the invention comprises
(i) an on-chip droplet generation module, as described above;
(ii) an emulsion re-injection module, as described above;
(iii) a droplet-pairing module, as described above;
(iv) a droplet fusion module, as described above, in which the droplets experience at least one acceleration and/or deceleration and/or reorientation and/or rearrangement in space and time, preferably a droplet fusion module comprising a channel with a zigzag geometry;
(v) optionally, a stabilization module, as described above; and,
(vi) a droplet collection module, as described above.

In a particular embodiment, the chip of the invention comprises
(i) an on-chip droplet generation module, as described above;
(ii) an emulsion re-injection module, as described above;
(iii) a droplet-pairing module, as described above;
(iv) a droplet fusion module, as described above, in which the droplets experience at least one acceleration and/or deceleration and/or reorientation and/or rearrangement in space and time, preferably a droplet fusion module comprising a channel with a zigzag geometry;
(v) optionally, a stabilization module, as described above;
(vi) a droplet sorting module, preferably a passive size-dependent droplet separation module as described above; and
(vii) a droplet collection module.

In an embodiment, the on-chip droplet generation module is in communication with the droplet-pairing module; the emulsion re-injection module is in communication with the droplet-pairing module downstream of the on-chip generation module; the droplet pairing module is connected to the droplet fusion module; when present, the at least one droplet stabilization module may be connected to the droplet pairing module downstream of the emulsion re-injection module and upstream of the droplet fusion module or may be connected downstream of the fusion module and upstream the collection module; and the collection module is in communication with the droplet fusion module. When present, the droplet sorting module is downstream of the droplet fusion module and upstream of the droplet collection module.

The present invention also provides a chip comprising a passive size-dependent droplet separation module comprising (i) a main channel having a depth smaller than the diameter of the larger droplets to be sorted and a width larger than the diameter of said larger droplets, and (ii) two channels that branch of on either side of said main channel and having a width larger than the diameter of the smaller droplets to be sorted and smaller than the diameter of the larger droplets to be sorted.

The chip of the invention may further comprise:
at least one on-chip droplet generation module as described above; and/or
at least one emulsion re-injection module as described above; and/or
a droplet-pairing module as described above; and/or
at least one stabilization module as described above; and/or
a droplet fusion module, and in particular a droplet fusion module as described above; and/or
a droplet collection module, as described above.

All the embodiments disclosed for the method for fusing droplets are also contemplated in this chip.

The chip of the invention may be fabricated by any method known by the skilled person such as soft lithography (Xia and Whitesides, 1998) Materials suitable to be used in chip fabrication are known by the skilled person (Xia and Whitesides 1998; Cygan, Cabral et al. 2005; Utada, Lorenceau et al. 2005; Xu, Li et al. 2006; Yobas, Martens et al. 2006; Abate, Lee et al. 2008). Fabrication of a microfluidic device is exemplified in the experimental section.

Passive filters used in the chip of the invention are used to prevent channels from clogging and act as solid support to avoid collapse of device structure. These filters are well-known by the skilled person and their uses are illustrated in Figures.

The following examples are given for purposes of illustration and not by way of limitation.

EXAMPLES

Example 1

Experimental Methods
Microfluidics Device Fabrication and Running

Rectangular microfluidic channels were fabricated using soft lithography (Xia and Whitesides, 2008) by pouring poly(dimethylsiloxane) (PDMS, Sylgard 184, Dow Corning Corp.) onto a positive-relief silicon wafer (SILTRONIX) patterned with SU-8 photoresist (Microchem Corp). Curing agent was added to PDMS base to a final concentration of 10% (w/w), degassed and poured over the mould for cross-linking at 65° C. for 12 hours. The structured PDMS layer was peeled off the mould and the inlet and outlet holes were punched with a 0.75 mm-diameter Harris Uni-Core biopsy punch (Electron Microscopy Sciences). The microchannels were sealed by bonding the PDMS to glass using an oxygen plasma (PlasmaPrep 2 plasma oven; GaLa Instrumente GmbH). The channels were treated with surface coating agent (Aquapel, PPG Industries) to make it hydrophobic and subsequently flushed with nitrogen. Fluorinated oil FC40 (3M) containing different concentrations of EA-surfactant (RainDance Technologies, Lexington, Mass.), which is a PFPE-PEG-PFPE amphiphilic block copolymer (Holtze et al., 2008), was used as a carrier fluid. The aqueous phase consisted of 100 mM Tris-HCl [pH 8.0], 100 mM NaCl or otherwise as indicated. Each of the phases were injected into the PDMS channels via PTFE tubing (int. 0.56 mm; ext. 1.07 mm, Fisher Bioblock) connected to 1 mL syringes (Omnifix-F®, BRAUN) and 0.6×25 mm Neolus needles (Terumo Corporation). The flow rates of liquids and oil were controlled by syringe pumps (PHD 2000, Harvard Apparatus). Emulsions were collected off-chip into a 1 mL syringe (Omnifix-F®, BRAUN) or into a PTFE tubing (int. 0.56 mm; ext. 1.07 mm) depending on the amount of collected emulsion. The flow rates for aqueous phases were in the range of 50-100 µL/hr, for the carrier oil 60-150 µL/hr and for re-injected emulsion 10-200 µL/hr.

Droplet Production for Re-Injection

Figure 1B:
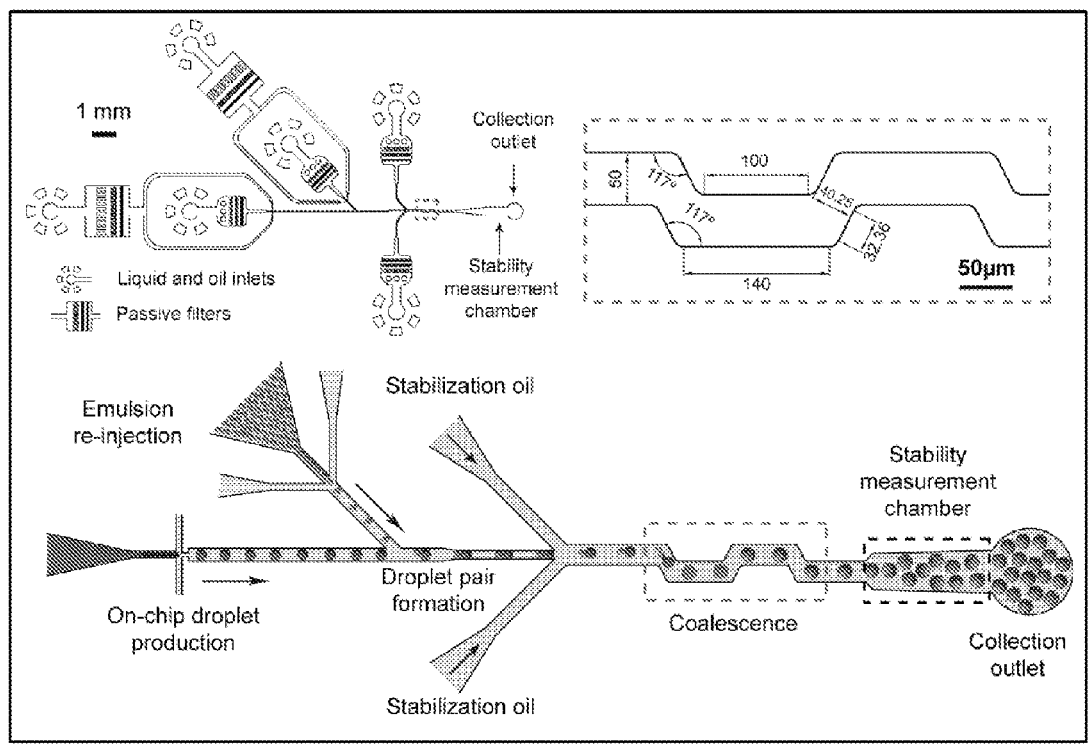
FIG. 1B. Design and schematic of the droplet fusion device. The schematic shows the main steps including droplet generation on-chip, emulsion re-injection, droplet pair formation, coalescence, emulsion stability measurement and finally collection of fused droplets off-chip. The dotted line box indicates the coalescence module with dimensions in µm. The depth of channels was 20 µm.

To produce droplets for re-injection, monodisperse 3.0 pL droplets were created at a rate of 9200 $s^{-1}$ using a microfluidic device containing a flow-focusing junction (Xia and Whitesides, 2008) with a 10 µm orifice (FIG. 1A). The depth of the channels was 10 µm. Before reaching the collection outlet, droplets were stabilized by the 4% (w/w) EA-surfactant in a 1.5 mm long and 30 µm wide channel. The aqueous phase of these droplets, in addition to the buffer, contained 50 mM Methylene Blue dye. For each individual experiment, >$10^7$ droplets were created and collected off-chip over 1 hour. The collected emulsions were then reloaded into a second PDMS chip (FIG. 1B) where they were spaced with carrier oil and fused with droplets generated on-chip. During re-injection microscopic observation indicated less than <0.5% of undesirable droplet coalescence after off-chip storage (data not shown).

Droplet fusion

Droplets were fused on a microfluidic device consisting of six separate modules integrated on a single microfluidic chip for: (i) emulsion re-injection, (ii) on-device ("on-chip ") droplet generation, (iii) droplet pairing, (iv) droplet fusion, (v) emulsion stabilization and (vi) emulsion stability measurement (FIG. 1B). The depth of the channels was 20 µm. The emulsion re-injection module consisted of a ψ-shaped structure where droplets were spaced by carrier oil containing varying concentrations of EA-surfactant. The re-injection frequency was ~1.8 kHz (20µL/hr for re-injected emulsion and 120 µL/hr for carrier oil) or otherwise as indicated. The on-chip droplet generation module had a flow-focusing junction with a 10 µm wide and 15 µm long constriction allowing the production of droplets of different size, from ~8 to 18 pL. The frequency of droplet production on-chip was 1.55 kHz or otherwise as indicated. The flow rates for 9 pL on-chip droplet generation were 50 µL/hr for the aqueous phase and 150 µL/hr for the continuous phase. The channel down to the nozzle was 30 µm wide and 2.7 mm long. A pair of droplets was formed in the 20 µm wide and 1.35 mm long pairing channel. The pairing module was connected to the fusion module through the 50 µm wide and 500 µm long channel having two side arms used to supply oil containing higher concentrations of surfactant (stabilization oil) and to space performed droplet pairs. The droplet fusion module contained 50 µm wide and 140 µm long segmented channels connected by 40 µm wide sections (FIG. 1B, dotted line box) where droplet pairs were coalesced. After coalescence, the droplets flowed into the 600 µm long exit channel connected to the stability measurement chamber (250 µm wide and 1660 µm long) where undesirable on-chip droplet coalescence was monitored. Finally, all droplets reached the collection outlet.

On-Chip Droplet Analysis and Fluorescence Detection

A Phantom v4.2 high-speed digital camera (Vision Research) was mounted on the top camera port of an Axiovert 200 inverted microscope (Carl Zeiss SAS) to capture digital images during droplet production, fusion and re-injection. For each condition tested, 150 digital images of droplets passing through the detection chamber (corresponding to >$10^3$ droplets produced on-chip) were manually analyzed.

Figure 1C:
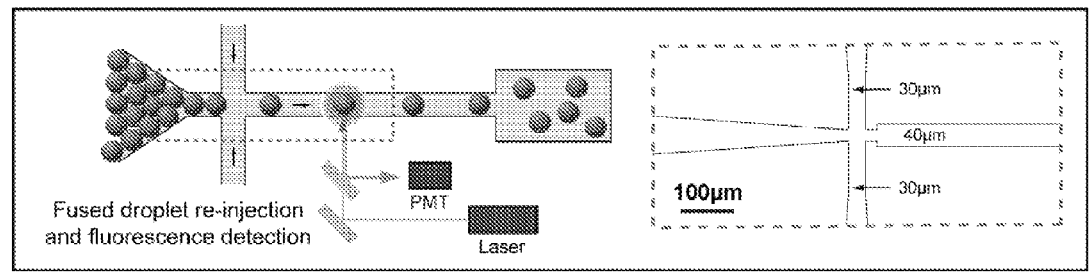
FIG. 1C. Schematic of the fluorescence detection device. The emulsion collected off-chip after fusion was re-injected into the device and droplets were spaced with surfactant-free FC40 oil in a 40 µm wide and 500 µm long channel. Droplet fluorescence was measured in the middle of the 40 µm wide channel. After fluorescence detection, droplets entered the waste outlet. These droplets could also be collected off-chip for further manipulations or analysis. The dotted line box shows the re-injection nozzle with dimensions in µm. Channels were 20 µm deep.

The emulsions collected after coalescence were re-injected onto the droplet detection microfluidic device (FIG. 1C) and droplets were spaced with carrier oil (without surfactant) in a 40 µm wide and 500 µm long channel. Droplet fluorescence was measured in the middle of this channel using the optical set-up described in the FIG. 2. For each droplet passing the detector the fluorescence was analyzed to determine the peak height (corresponding to the droplet fluorescence) and width (corresponding to the droplet diameter).

Results

The droplet fusion device (FIG. 1B) is designed to fuse droplets from a re-injected emulsion with droplets generated on-chip. On-chip droplet production was tested on the droplet fusion device using the fluorinated carrier oil FC40 containing different concentrations of fluorinated EA-surfactant. Reliable on-chip droplet production was obtained with >0.05% (w/w) EA-surfactant (FIG. 3A). With surfactant concentrations from 0.11 to 5%, droplet production on-chip was stable for hours and was independent on the concentration of surfactant used. However, in the absence of surfactant, on-chip droplet production on the system used was impossible due to wetting of the channel walls (FIG. 3B). The stability of droplets generated on-chip was then tested using 0.05, 0.11, 0.55 and 2.8% EA-surfactant. Coalescence of the droplets was monitored in the emulsion stability measurement chamber where the channel widened provoked collisions between droplets. Uncontrolled coalescence events were observed with droplets generated on-chip using 0.05% surfactant. However, droplet stability increased with increasing surfactant concentration. With 0.05-0.55% surfactant uncontrolled coalescence events remain observable, proving that the droplets were partially stabilized by the surfactant from the carrier oil (FIG. 3C).

Stable 3.0 pL droplets were produced as described above containing 50 mM Methylene Blue dye on a first microfluidic chip (FIG. 1A) using FC40 oil containing 4% EA-surfactant and introduced onto a second microfluidic chip (FIG. 1B), where they were paired with 9.0 pL droplets generated on-chip. The flow rate of the carrier oil was adjusted to space the re-injected emulsion before being paired with on-chip generated droplets. The FC40 carrier oil used to create droplets on-chip and to space re-injected droplets contained 0.11-2.8% EA-surfactant.

The droplet re-injection rate was kept higher than the on-chip droplet production rate, so that all on-chip generated droplets would be paired with re-injected droplets. Typically, droplets were re-injected at ~1.8 kHz and produced droplets on-chip at ~1.55 kHz, so that on average one on-chip droplet would be paired with ~1.2 re-injected droplets. Pairs of on-chip generated droplet and re-injected droplets were formed in the Y-shaped pairing channel, used to connect the emulsion re-injection module with on-chip droplet generation module (FIG. 1B). Once droplet pairs were formed they entered a 50 µm wide and 500 µm long channel connecting the droplet pairing and droplet fusion (coalescence) modules.

At the end of the 500 µm long channel in the droplet fusion device (FIG. 1B) the re-injected droplets and droplets generated on-chip, in carrier oil containing 0.11-2.8% surfactant, entered the coalescence module. This module consisted of 50 µm wide and 140 µm long segmented channels connected at an angle of 117° by 40 µm wide sections (FIG. 1B, dotted line box). The zig-zag geometry of the coalescence module induces the fusion between droplet pairs. Using 0.55% surfactant in the carrier oil, more than 98% of droplets generated on chip were fused one-to-one with re-injected droplets (FIG. 4). In contrast, using a coalescence module without the zig-zag geometry resulted in significantly lower fusion efficiency: less than 70% of droplets pairs coalesced with the same concentration of surfactant (0.55%) in the carrier oil. In addition, the zig-zag structure specifically enhanced one-to-one fusion: with a four-fold excess of re-injected droplets, the zig-zag structure produced 10 times less undesirable multiple fusion events, compared to a module without the zig-zag structure.

However, one-to-one fused droplets were not completely stable and some uncontrolled coalescence was observed in the stability measurement chamber (FIG. 5A). Injection of carrier oil containing 2.8% EA-surfactant shortly after droplet pair formation allowed the droplets to be stabilized by the time they reached the stability measurement chamber (~10 ms after adding the stabilization oil) (FIG. 5B).

However, because of the lower surfactant concentration (0.55%) used for on-chip droplet production, there was not sufficient time for enough surfactant to partition to the water-oil interface for the droplets generated on-chip to be stabilized against pairwise coalescence by the time that they reached the coalescence module (~30 ms). The time for droplets generated on-chip to reach the pairing channel (~23 ms) was, however, sufficient to allow enough surfactant to partition into the interface to prevent uncontrolled coalescence within the pairing module. After droplet pair formation, it took ~6 ms for the droplet pair to transit the pairing module. Decreasing the amount of surfactant in the stabilization oil down to 0.55% led to undesirable coalescence of fused droplets (FIG. 5C). The fusion efficiencies using carrier oil containing from 0.11 to 2.8% (w/w) EA-surfactant for production of droplets on-chip and for spacing the re-injected emulsion, and stabilization oil contained 2.8% EA-surfactant are summarized in the Table 1 below.

group of three droplets (one on-chip droplet [clear] vs two re-injected [black] droplets) only a single one-to-one fusion occurred (FIG. 4).

Detailed analysis of the recorded digital images showed that selective one-to-one droplet fusion in multiple droplet clusters occurs with a single re-injected droplet being firstly paired with on-chip droplet. Re-injected droplets that come in contact with on-chip droplet afterwards are less prone to fusion. After the first fusion event, with a single re-injected droplet, the newly formed interface of the fused droplet becomes stabilized by the surfactant from the re-injected droplet and thus prevents further fusion events with other droplets.

Multiple fusion events were not observed even when multiple clusters of re-injected droplets formed. Using

TABLE 1

Droplet fusion efficiency using different concentrations of surfactant

| | | | Undesirable coalescence[2] | | | |
|---|---|---|---|---|---|---|
| Surfactant concentration in oil[1] [%, (w/w)] | Fused one-to-one droplets[2,3] [grey] | Un-fused on-chip droplets[2,4] [clear] | Fused droplets one-to-two[5] [1 clear + 2 black] | Twice fused droplets[6] [2 grey] | Three times fused droplets[7] [3 grey] | Multiple times fused droplets[8] [3-6 grey] |
| 0.11 | 95.34% | 0.35% | 0.26% | 1.25% | 0.9% | 1.9% |
| 0.27 | 99.38% | 0.2% | 0.07% | 0.21% | 0.09% | 0.05% |
| 0.55 | 98.48% | 1.5% | 0.09% | 0.1% | 0.01% | 0% |
| 0.55* | 85.3% | 0.67% | 1.15% | 1.44% | 1.14% | 10.3% |
| 1.11 | 88.1% | 11.54% | 0.03% | 0.22% | 0.11% | 0% |
| 2.22 | 59.75% | 39.9% | 0.01% | 0.26% | 0.07% | 0% |
| 2.8 | 26.4% | 73.6% | 0% | 0% | 0% | 0% |

[1]EA-surfactant concentration in the FC40 carrier oil used to produce droplets on-chip and to space the re-injected droplets. Stabilization oil contained 2.8% EA-surfactant in the FC40 carrier oil.
[2]The amount of fused or un-fused droplets as a fraction of total number of droplets produced on-chip is indicated as a percentage.
[3]Droplets generated on-chip fused with one re-injected droplet (grey colour).
[4]Un-fused on-chip generated droplets (clear).
[5]Droplets generated on-chip (clear) fused with two re-injected (black) droplets (one clear droplet fused with two black droplets).
[6]Fused droplets, which underwent a second coalescence event (two grey droplets merged).
[7]Fused droplets, which underwent a third coalescence event (three grey droplets merged).
[8]Fused droplets, which underwent multiple coalescence events (three to six grey droplets merged).
*The stabilization oil contained the same amount of surfactant (0.55%) as the carrier oil used to produce droplets on-chip and to space re-injected droplets.

For each surfactant concentration over $10^4$ fused droplets were analyzed using series of images recorded by a high-speed camera. Using carrier oil containing 0.27-0.55% surfactant ~98-99% of droplets generated on-chip were fused one-to-one with a single re-injected droplet and only occasional uncontrolled fusion events were observed. On-chip droplets fusing with two re-injected droplets contained a higher concentration of Methylene Blue and were thus darker in colour (see FIG. 5C) than the correctly fused (one-to-one) droplets facilitating the analysis. In addition, uncontrolled droplet fusion events could be distinguished by the size of the droplet. Because droplets generated on-chip were paired with an excess of re-injected droplets, almost all on-chip droplets were fused. However, controlled one-to-one fusion decreased when the surfactant concentration in the carrier oil was ≥1.11% due to the droplets generated on-chip becoming stabilized by surfactant before reaching the fusion module.

Figure 6:
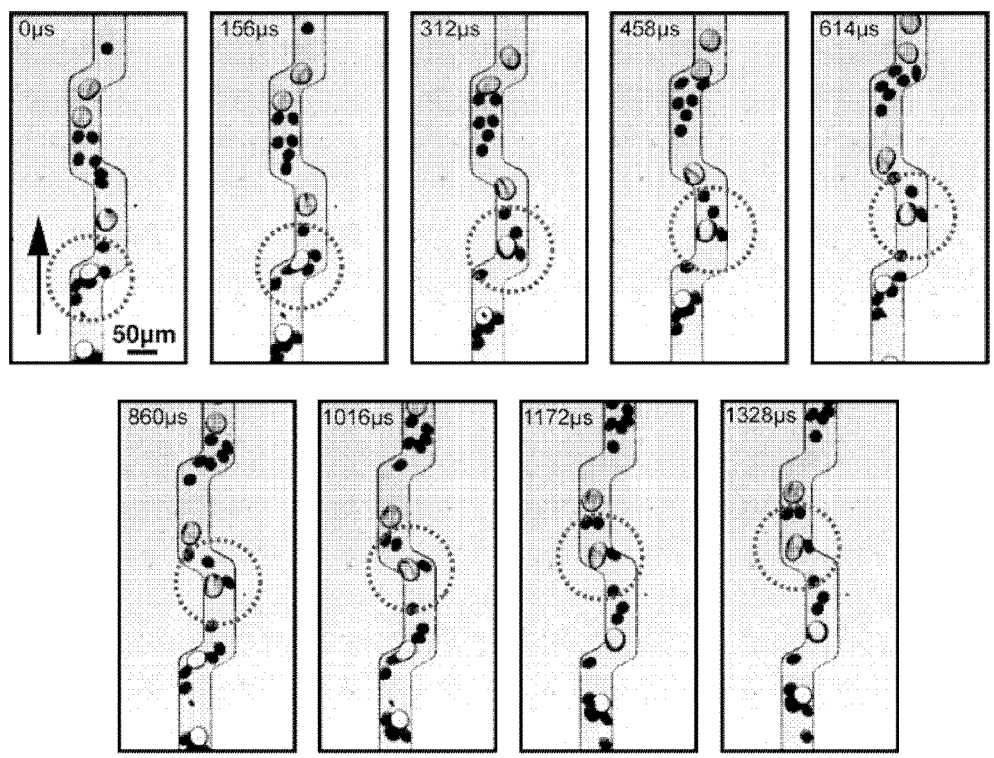
FIG. 6: On-chip generated droplet fusion with an excess of re-injected droplets. The re-injected droplets are dark due to Methylene Blue dye, droplets generated on-chip are clear. The dotted line circles follow one of the on-chip generated droplet within the coalescence region in time. It shows that in the group of five droplets (four re-injected droplets and one droplet generated on-chip) only a single one-to-one coalescence event occurs (one of the four re-injected droplets fuses with a single droplet generated on-chip). The black arrow indicates the direction of the flow. The FC40 fluorinated oil used to create droplets on-chip and space re-injected droplets contained 0.55% EA-surfactant. The stabilization oil contained 2.8% EA-surfactant.

After fusion of a surfactant stabilized re-injected droplet with an on-chip droplet only partially stabilized by surfactant, the newly formed droplet became further stabilized against undesirable coalescence. Hence, only one re-injected droplet fused with one droplet generated on-chip even when the re-injected droplets were in excess. For example, in a 0.55% surfactant in the carrier oil, 9 pL droplets were produced on-chip at constant 1.55 kHz rate, and the re-injection frequency of 3 pL droplets was varied from 1.0 to 5.0 kHz. Different droplet re-injection frequencies allowed the formation of multiple droplet clusters: 1-5 re-injected droplets were paired with one droplet generated on-chip. Analysis of over $10^4$ droplets in the stability measurement chamber showed over 96% of all on-chip generated droplets were fusing selectively to one re-injected droplet independent of the number of re-injected droplets (FIG. 6). These results clearly show that careful synchronization of the droplet pairs was not necessary to obtain highly efficient and reliable one-to-one droplet fusion.

Figure 7:
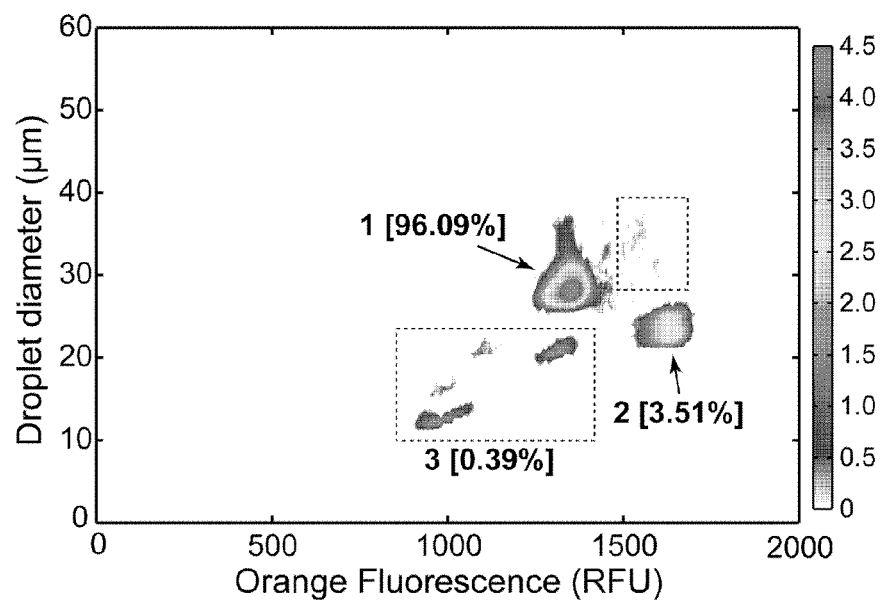
FIG. 7: Quantitative analysis of the emulsion after fusion, storage off-chip and re-injection. The carrier oil used in the experiment contained 0.55% EA-surfactant and the stabilization oil contained 2.8% EA-surfactant. In total over $10^6$ droplets were analyzed and the droplet number is given on a logarithmic scale (bar). Numbers inside the 2-D contour plot correspond to the different droplet populations: (1) droplets generated on-chip fused one-to-one with re-injected droplets; (2) un-fused droplets generated on-chip; (3) droplets experiencing uncontrolled coalescence (upper dashed box) or splitting (lower dashed box). The percentage of droplets in each population is shown in brackets. Re-injected droplets did not contained fluorescent dye and therefore went undetected.

To prove that the fused emulsion is suitable for further manipulations, fused droplet stability were tested after storage off-chip using carrier oil containing 0.11, 0.27 and 0.55% EA-surfactant and stabilization oil containing 2.8% EA-surfactant. Since on-chip droplets produced with ≥1.11% surfactant showed decreased fusion efficiency with re-injected droplet (see Table 1 above), they were not included in the test. The re-injected droplets [3 pL] were fused with droplets generated on-chip [9 pL] as described above. To monitor on-chip droplet fusion efficiency with re-injected droplets, the droplets generated on-chip were labeled with the fluorescent dye resorufin (100 µM). The droplet re-injection rate was ~1.8 kHz, and on-chip droplet production rate ~1.55 kHz, so that all of the droplets generated on-chip would be paired with re-injected droplet (1 on-chip droplet to 1.2 re-injected droplets). Over $10^6$ droplet pairs were fused and collected off-chip. Afterwards, all collected droplets were reloaded into a third microfluidics device (FIG. 1C) at ~0.7 kHz, spaced with carrier oil (without surfactant) and excited with a 532 nm laser. Fused droplets and non-fused on-chip droplets were detected using a photomultiplier tube (PMT) with a 617/70 nm bandpass filter. The signal output from the PMT allowed the measurement of the peak fluorescence and diameter of each droplet. Analysis of over $10^6$ re-injected droplets confirmed our previous microscopic observations on-chip. Using 0.55% surfactant, 96.09% of all droplets generated on-chip were fused solely to one re-injected droplet, with less than 4% of all on-chip droplets remaining unfused (FIG. 7).

Uncontrolled on-chip droplet coalescence was lower than 0.5% with 0.55% surfactant, but at lower surfactant concentrations higher numbers of uncontrolled droplet fusion events were observed (Table 2).

TABLE 2

Re-injection of fused droplets

| Surfactant concentration in oil [% (w/w)][1] | Droplets fused one-to-one [%][2] | Droplets fused two-to-one [%][3] | Unfused on-chip droplets [%][4] | Uncontrolled fusion or splitting [%][5] |
|---|---|---|---|---|
| 0.11 | 90.1 | 0.81 | 1.11 | 7.98 |
| 0.27 | 95.33 | 0.01 | 1.84 | 2.82 |
| 0.55 | 96.09 | 0.01 | 3.51 | 0.39 |

[1]Surfactant concentration in the carrier oil used for the droplets generated on chip and to space the re-injected droplets.
[2]The percentage of droplets generated on-chip fused one-to-one with re-injected droplets.
[3]The percentage of droplets generated on-chip fused with two re-injected droplets.
[4]The percentage of unfused droplets generated on-chip.
[5]The percentage of uncontrolled coalescence or splitting events between multiple droplets.

As expected, the diameter of the droplets within different populations correlated with the expected droplet volumes. For example, one-to-one fused droplets were expected to have 12 pL volume (or ~28 µm diameter), which is in good agreement with the diameter observed (FIG. 7).

Additional experiments were performed to test coalescence between droplets of different sizes. On-chip droplets from 8 to 18 pL volume were created by varying the flow rates of carrier oil and aqueous phases and fused with 3 pL re-injected droplets. Independently of the size, over 96% of the droplets were fused one-to-one (one droplet generated on-chip to one re-injected droplet). The same results were obtained when re-injected droplets from ~2 to 4 pL were used. However, it is noteworthy that larger on-chip droplets are less stable after fusion and the number of undesirable fusion events increased up to ~3% with 15 pL droplets. Furthermore, droplet fusion using different buffers (PIPES, HEPES, Tris, Phosphate), pH (from 6 to 8), ionic strengths (from 0 to 100 mM NaCl), and different protein concentrations (from 0 to 1 mg/mL BSA) were tested. In all the cases, no difference in fusion efficiency was observed.

The re-injected droplets, were produced on a separate microfluidics chip (see FIG. 1A) where they were stabilized by the high concentration of surfactant (4%). These droplets could be stored off-chip without any significant undesirable coalescence for long period of time (>24 h). The droplets were then re-injected onto a second microfluidic chip (FIG. 1B) and paired with droplets newly created on-chip. The droplets created on-chip were generated using carrier oil containing a lower concentration of surfactant (optimally 0.55%). Although this concentration was sufficient to stabilize droplets at equilibrium, by the time the droplets reached the coalescence module (~30 ms) the surfactant molecules did not have time to diffuse and build up at the water-oil interface. Therefore these droplets are unstable and could fuse with the re-injected droplets. In the classical view of emulsions, droplets covered by surfactants are stabilized by the steric repulsion of the surfactant tails on each side of the film of continuous phase between the two droplets. Here the stability of the interface is drastically reduced by the low density of surfactant molecules at the interface of the on-chip produced droplets which favours coalescence. However, there is still a small barrier of energy to overcome in order to induce the coalescence. This additional energy is given by the flow of the droplets in the channel: indeed the efficiency of the one-to-one fusion could be enhanced significantly by using a zig-zag channel comprising 50 µm wide and 140 µm long segmented channels connected at an angle of 117° by 40 µm wide sections. Using a 1.2-fold excess of the re-injected droplets over 96% of droplets generated on-chip were fused one-to-one with a single re-injected droplet. Using the channel lacking the zig-zag structure and changes in channel width decreased both droplet fusion efficiency and increased the frequency of undesired multiple droplet coalescence events. Therefore, the relatively small disturbances caused by the flow pattern helped to destabilize the droplets leading to coalescence. The zig-zag channel geometry induced a distribution of speeds of the continuous phase in the direction of the flow and produced a series of accelerations and decelerations of the droplets. These changes in speed can explain the increase of coalescence efficiency according to the coalescence mechanism recently described (Bremond et al., 2008): the acceleration of the droplet is responsible for emulsion decompression, leading to coalescence. At the molecular level, the dynamics of the surfactant molecules at the interface might also be involved: the zig-zag flow pattern may induce a series of deformations of the interface. During this deformation, some regions of the droplets can be locally depleted of surfactant leading to coalescence.

Example 2

The inventors herein disclose a system for passive droplet separation using hydrodynamics, allowing fast and efficient fractionation of droplets with a difference in volume of as small as 2.33-fold (corresponding to a 1.33-fold difference in diameter of spherical droplets). The utility of this system was demonstrated by combining this system with the passive droplet fusion system of the invention to create an integrated microfluidic device allowing the preparation of highly monodisperse pairwise fused droplets. The reliability of the system was confirmed by performing fluorescent analysis of fused and size-fractionated droplets after collection off-chip and reinjection.

To develop the passive droplet separation system, firstly two types of droplets were mixed on the same microfluidic chip and the droplets were analyzed after size-dependent sorting. The microfluidic chips, containing rectangular channels, were fabricated using standard soft lithography methods as described previously (Mazutis et al., 2009a). Droplet separation was analyzed manually after recording the digital movies using a high-speed camera (Phantom v4.2, Vision Research) mounted on an Axiovert 200 inverted microscope (Carl Zeiss SAS) and by measuring droplet fluorescence using the optical set-up described elsewhere (Mazutis et al., 2009b). For each manual analysis ≥10² droplets were analyzed and ~10⁵ droplets were analyzed using fluorescence. A schematic and the operation of the passive droplet separation device is shown in FIG. 8.

The larger, monodisperse droplets were created at a flow-focusing junction directly on the device. The volume of these droplets was varied from 5 to 40 pL (corresponding to spherical droplets of 21 to 43 μm diameter) by adjusting flow rates of the aqueous and oil phases, using syringe pumps (PHD 22/2000, Harvard Apparatus). The smaller droplets, of 3.0 pL volume (corresponding to spherical droplets of 18.0 μm diameter), containing 50 mM Methylene Blue dye, were created on a separate microfluidic chip. In total, over $10^7$ droplets were collected off-chip into PTFE tubing, introduced back onto the microfluidic device (FIG. 8) and mixed with larger droplets for the separation analysis. The carrier oil used to create droplets on-chip and to space reinjected droplets was FC40 (3M) containing 2% EA-surfactant (RainDance Technologies; Lexington, Mass.), which is a PFPE-PEG-PFPE amphiphilic tri-block copolymer (Holtze et al., 2008).

Figure 8B:
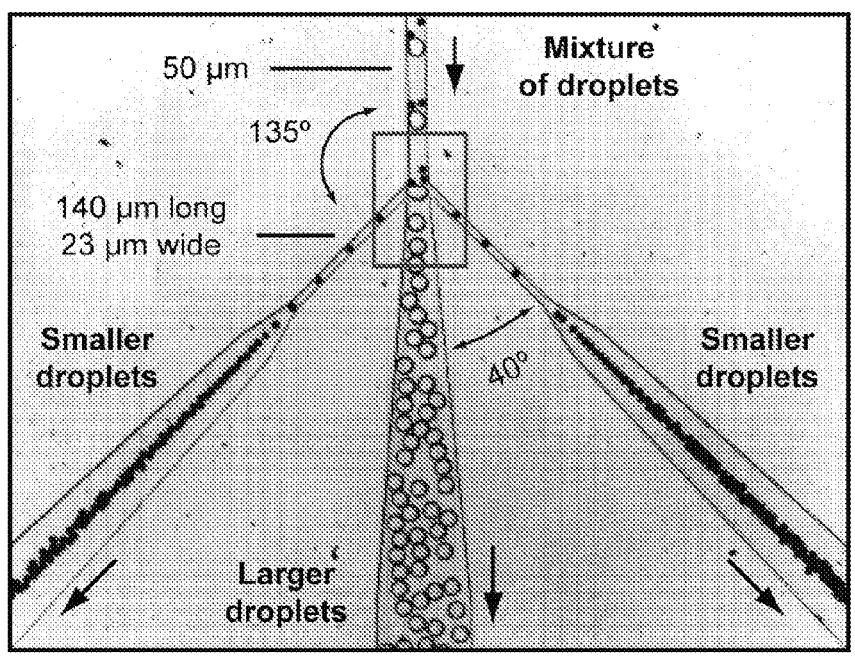
FIG. 8B. Light micrograph of the passive droplet separation module. Black arrows indicate the direction of the flow. Larger droplets were 20 pL and smaller droplets 3 pL.
Figure 8C:
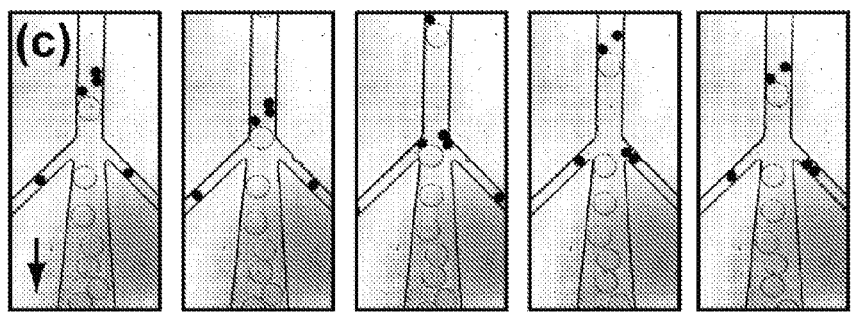
FIG. 8C. Magnified view corresponding to the square in the top panel. The time step between each image is 477 µs.

Since the diameter of the first droplets (>24 μm) was larger than the depth of the device (20 μm), these droplets were pinched along the vertical axis. On the other hand, the second droplets (18 μm diameter) were not constrained by the walls of the device and remained spherical. Due to these size differences, larger droplets moved within channels at an average speed approximately ~1.2-fold lower than the smaller droplets and thus restricted the passage of the smaller droplets. However, because the width of the main channel (50 μm) was larger than the diameter of the pinched droplets, the flow alongside the walls was not blocked by these droplets. This hydrodynamic effect caused smaller droplets to flow near the wall of the channel. The inventors exploited this phenomenon to separate smaller droplets by incorporating two narrow channels (23 μm wide and 140 μm long) that branch off on either side of the main channel. Once smaller droplets reach the side channels, the hydrodynamic flow drags them into these channels, allowing efficient separation from larger droplets (FIGS. 8B and 8C). Since the larger droplets stay in the center of the main channel, they are not significantly affected by the hydrodynamic flow moving into the side channels and continue to flow in the main channel to the outlet.

Recent studies pointed out that distribution of droplets at branched microfluidic channels is an intrinsically non-linear and complex dynamical process because the hydrodynamic resistance of each micro fluidic channel is strongly affected by the number and size of droplet it contains (Engl et al., 2005; Cristobal et al., 2006). At low Reynolds and Capillary numbers, the distribution of droplets into the sidearms of a T-junction can be controlled by increasing the critical distance between incoming droplets and by adjusting the relative hydrodynamic flow resistance within the two exit channels (Engl et al., 2005; Link et al., 2004). Taking into account these effects, the inventors used a microfluidic system where the flow regime was laminar with moderate Capillary and Reynolds numbers, Ca~0.1 and Re~1, respectively. To adjust fluidic resistance within microfluidic channels, they expanded the main channel directly after the junction with the two sidearms (FIG. 8B). Due to this expansion fluidic resistance (Fuerstman et al., 2007), defined as $\Delta P = a\mu QL/WH^3$, where μ is viscosity, Q total flow rate, L, W, H the length, width and height of the channel and a is dimensionless parameter $$a = 12\left[\frac{1 - 192H}{\pi^5 W}\tanh\left(\frac{\pi W}{2H}\right)\right]^{-1},$$

was ~16-times lower than in the side channels, $\Delta P_{main}$ ~490 kg m⁻¹ s⁻¹ and $\Delta P_{side}$ 7800 kg m⁻¹ s⁻¹, respectively. Furthermore, when droplets reached the junction with the sidearms, they decelerated and at the same time larger droplets (≥20 pL) became temporally elongated. Both of these effects blocked the entrance of other droplets, following closely behind, into the main channel.

To validate the efficiency of droplet separation, different size droplets were produced on-chip (5 to 44 pL) and were mixed with smaller droplets (3 pL) up to 5-fold in excess. The results are summarized in FIG. 9. During these experiments, it was observed that droplet separation was affected by the spacing factor λ (μm), which has been defined as the distance between the centers of mass of the larger droplets (FIG. 9 Inset). At high λ values (>160 μm), smaller droplets moved to the center of the main channel and thus were filtered with less efficiency. On other hand, at low λ values (<40 μm), droplets formed complex multiple clusters, decreasing size-dependent separation efficiency. However, by keeping λ value between 60-140 μm, the inventors obtained efficient separation of 3 pL droplets from 7 to 40 pL droplets. This corresponds to a difference in volume of as small as 2.33-fold (or a 1.33-fold difference in diameter of spherical droplets). Larger droplets (>44 pL) tend to break at the edges of the junction of the separation channels with the main channel, leading to a polydisperse emulsion at the collection outlet, while smaller than 7 pL droplets moved at almost the same speed as 3 pL droplets and were difficult to separate. Separation efficiency also decreased in the presence of a large excess (>5) of smaller droplets because the side channels were completely filled with smaller droplets blocking the entrance of other droplets. However, separation efficiency was not affected when the smaller droplets were 2 pL or if the reinjected emulsion was polydisperse (droplets ranging from ~0.9 to 4 pL). Additional experiments also confirmed that separation was not affected by the speed of droplets, in the range of 0.06-0.26 m s⁻¹ tested. Hence, completely passive droplet separation was highly efficient in different hydrodynamic regimes.

To further demonstrate the versatility of the droplet separation system, this system was combined with a passive droplet fusion device of the invention, as described above, to create a completely passive microfluidic platform allowing selective pairwise droplet fusion and fractionation to be performed without the need for an external energy source. The operation of an integrated microfluidic chip allowing selective one-to-one droplet fusion followed by size-fractionation of droplets to remove unfused re-injected droplets is shown in FIG. 10.

3 pL surfactant-stabilized droplets were re-injected at >3.0 kHz, while keeping production of 10 pL on-chip droplets constant at 1.5 kHz. Using these frequencies every droplet generated on-chip was paired with >2.0 reinjected droplets. The FC40 carrier oil used to create droplets on-chip contained 0.5% EA-surfactant, while the carrier oil used to space the reinjected emulsion and the pre-formed droplets pairs contained 2% EA-surfactant. The λ was adjusted to ~120 μm. Despite the excess of reinjected droplets, each droplet generated on chip fused selectively to only one reinjected droplet due to the stabilization of the fused droplet against further coalescence by the surfactant from the reinjected droplet. After passive droplet fusion and size-fractionation, the emulsion was collected off-chip and introduced back into a reinjection module (as in FIG. 8A) for further analysis. Fluorescence emission from ~$10^5$ droplets was induced by 488 and 532 nm lasers and epifluorescence recorded at 510/20 and 617/73 nm wavelengths using photomultiplier tubes. The results, presented in FIG. 10C, indicate that after passive droplet fusion and size fractionation, ~99% of the droplets were the result of a pairwise (one-to-one) droplet fusion. Analysis of digital images recorded using the high-speed camera showed that separation mistakes appeared during temporary increases in the rate of emulsion re-injection, which have been attributed to instability in the syringe pumps or "stick-slip" of the syringe plunger. As expected, further experiments confirmed that separation efficiency of unfused (reinjected) droplets was independent of the size of the droplets produced on-chip (from 8 to 20 pL being tested). Therefore, even with current tools, the throughput and efficiency of integrated microfluidic device was very high, allowing efficient fractionation of complex mixtures of droplets.

Accordingly, the size-fractionation module herein discloses is an efficient, flexible and completely passive microfluidic system allowing highly efficient and fast size-fractionation of emulsions. This system can be combined with other microfluidic modules such as passive droplet fusion module to prepare highly monodisperse emulsions, composed almost entirely of pairwise fused droplets. Such emulsions should be particularly useful if further manipulations requiring high monodispersity are required, for example droplet sorting triggered by dielectrophoresis (Baret et al., 2009) or other multi-step procedures (Mazutis et al., 2009b; Mazutis et al., 2009c).

Example 3

This example illustrates the selective coalescence of surfactant-stabilized droplets induced by the flow in microfluidic system. Individual surfactant-stabilized droplets from the emulsion were selectively coalesced with other droplets partially stabilized by the surfactant. The inventors showed selective pairwise and even multiple fusion events in highly controllable manner not feasible in prior art systems.

Material and Methods

Fabrication and Operation of Microfluidic Device

The microfluidic chip, containing rectangular channels 20 μm deep, was fabricated using standard soft lithography methods. Briefly, SU-8 2025 photoresist (Microchem Corp.) was poured onto a silicon wafer (Siltronix), patterned by UV exposure (MJB3 mask aligner, SUSS MicroTec) through a photolithography mask and subsequently developed with SU-8 developer (Microchem Corp). Curing agent was added to poly(dimethylsiloxane) PDMS base to a final concentration of 10% (w/w), degassed and poured over the mould for crosslinking at 65° C. for 12 hours. The structured PDMS layer was peeled off the mould and the inlet and outlet holes were punched with a 0.75 mm-diameter Harris Uni-Core biopsy punch (Electron Microscopy Sciences). The microchannels were sealed by bonding the PDMS to glass after expose to an oxygen plasma (PlasmaPrep 2 plasma oven; GaLa Instrumente GmbH). The channels were treated with surface coating agent (Aquapel, PPG Industries) to make it fluorofilic and subsequently flushed with nitrogen. The aqueous and oil phases were injected into the microfluidics channels via polytetrafluoroethylene [PTFE] tubing (int. 0.56 mm; ext. 1.07 mm) connected to 1 mL syringes (Omnifix-F®, Braun) and 0.6×25 mm Neolus needles (Terumo Corporation). The flow rates of liquids were controlled by syringe pumps (PHD 2000/2200, Harvard Apparatus) and were between 20-100 μL/hr for aqueous phase and between 40-200 μL/hr for the carrier oil. The aqueous phase was 100 mM Tris-HCl [pH 8.0] or otherwise as indicated. The continuous phase was FC40 (3M) fluorinated oil containing 2% (w/w) EA-surfactant (RainDance Technologies; Lexington, Mass.), which is a PFPE-PEG-PFPE tri-block copolymer, or otherwise as indicated.

The effect of gravity and inertial forces in our microfluidic systems can be neglected due to the small Weber and Bond numbers. Reynold and Capillary numbers were ~0.5 and ~0.02, respectively.

Characteristics of Dispersed and Continuous Phases

Using 2% EA-surfactant in FC40 oil as continuous phase droplet coalescence was tested with on-chip generated droplets containing pure water, 0.1 M sodium phosphate [pH 7.0], 0.1-1 M Tris-HCl [pH 8.0] and 0-1 M NaCl solutions. In all cases tested no reduction in coalescence efficiency was observed neither when the content of emulsion droplets was kept the same nor when it was different. Droplet fusion using different protein concentrations was also tested and no difference in coalescence efficiency was observed. Carrier oils used in experiments were FC40 (3M), FC77 (3M) and Galden-HT135 (Solvay Solexis). FC40 oil is perfluoro-tri-n-butylamine having average molecular weight $M_w$=650 g/mol, kinematic viscosity ν=1.8 cSt, density ρ=1850 kg/m$^3$. FC77 oil is perfluorooctane, $M_w$=416 g/mol, ν=0.72 cSt, ρ=1780 kg/m$^3$. Galden-HT135 oil is perfluoropolyether, $M_w$=610 g/mol, ν=1.0 cSt, ρ=1730 kg/m$^3$.

Production of Emulsions

To produce emulsion for reinjection, monodispersed 3.0, 5.0, 10.0, 15.0 and 20.0 pL droplets were created using separate microfluidic chips and FC40 oil supplemented with 5% EA-surfactant. To facilitate visual analysis during coalescence experiments 50 mM Methylene Blue dye were added into the aqueous phase of emulsion droplets. Emulsions were collected off-chip into polytetrafluoroethylene [PTFE] tubing (int. 0.56 mm; ext. 1.07 mm) and introduced into a microfluidic device using flow rates of 20-60 μL/hr.

Characteristics of the Ea-Surfactant

The EA-surfactant used in the study was PFPE-PEG-PFPE tri-block copolymer containing two perfluoropolyether blocks ($M_w$~2×6500 g/mol) and one poly(ethylene) glycol block ($M_w$~600 g/mol). Single PFPE block is primarily based on Krytox (DuPont) with polymerization degree $N_{PFPE}$=40-45, which is considerably larger than hydrophilic PEG block $N_{PEG}$=10-12, making EA-surfactant highly soluble in fluorinated oil and nearly insoluble in aqueous phase. The radius of gyration given by Flory relation $R_F$=a$N^{3/5}$~3 nm, where a ~0.2 nm is an effective monomer size and N=$N_{PEG}$+2$N_{PFPE}$ is a degree of polymerization. The cmc (critical micelle concentration) values in different fluorinated oils were determined by DLS measurements (Malvern Instruments). The cmc in FC-40 oil was ~75 μM. The interfacial tension in different fluorinated liquids is indicated in Table 3 below:

TABLE 3

Summary of interfacial tension measurements

| Dispersed phase | Continuous phase | Interfacial tension, γ [mN/m] |
|---|---|---|
| FC-40 | Water | 53.90 ± 0.67 |
| FC-77 | Water | 51.91 ± 0.77 |
| Galden HT-135 | Water | 51.03 ± 0.48 |
| FC-40 | 10% EtOH | 35.33 ± 0.35 |

TABLE 3-continued

Summary of interfacial tension measurements

| Dispersed phase | Continuous phase | Interfacial tension, γ [mN/m] |
|---|---|---|
| FC-40 | 40% EtOH | 16.08 ± 0.03 |
| FC-40 | 96% EtOH | 5.32 ± 0.26 |
| FC-40 with 5% EA-surfactant | Water | 4.4 ± 0.3 |
| FC-77 with 5% EA-surfactant | Water | 4.16 ± 0.14 |
| Galden HT-135 with 5% EA-surfactant | Water | 5.22 ± 0.07 |

Interfacial Tension Measurements

Interfacial tension was measured with a commercial drop shape analysis system (DSA100S, Krüss), equipped with DSA software (Version 1.90.0.14), which fits digital drop profile to a numerical solution of the Young-Laplace equation. 50 µl Hamilton syringes (Harvard Apparatus) pre-filled with the fluorinated oil were used to produce hanging drop on a bevelled tip of 22 gauge 0.72 mm needle (Hamilton) merged into a glass cell (Hellma), filled with aqueous solution (MQ-Water, 11%, 40% or 96% ethanol). The measurements were performed at 23° C. and are reported in Table 3.

Results

Figure 12:
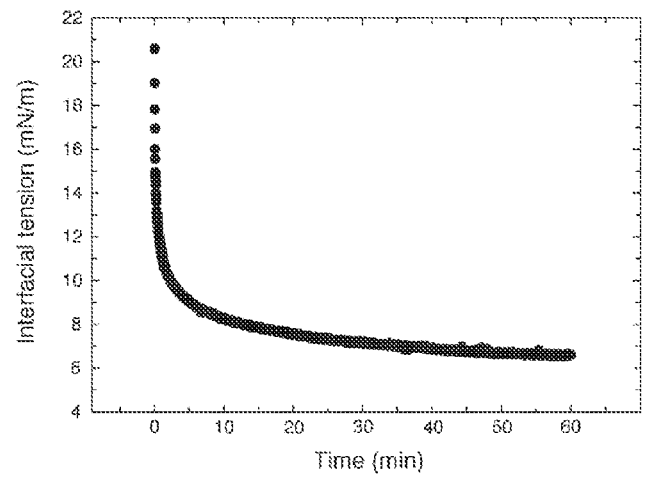
FIG. 12: The dynamics of interfacial tension for EA-surfactant adsorption at the FC-40 oil and water interface. The dispersed phase (1 µl) was FC-40 fluorinated oil containing 5% (w/w) EA-surfactant and continuous phase was pure water. The interfacial tension values (mN/m) were obtained by fitting the Young-Laplace equation on a droplet profile with DSA software (Krüss). The surface tension value after 1 hour of incubation was ~6.60 mN/m. Temperature during the measurements was 23±0.5° C.
Figure 13:
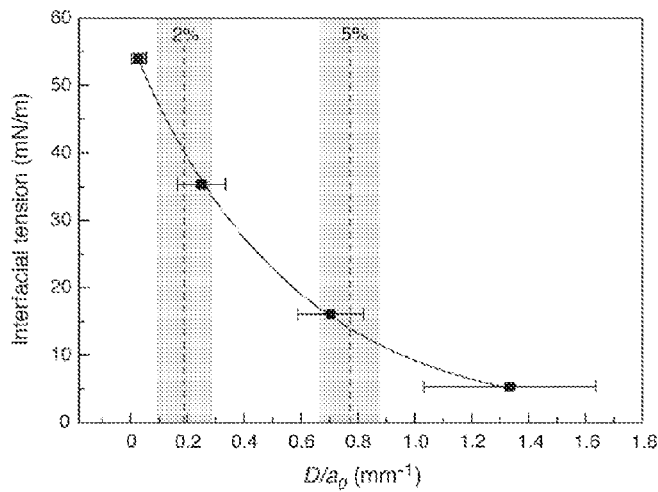
FIG. 13: Dynamic surface tension measurements. To obtain interfacial tension values in the system, a microfluidic approach reported previously (Hudson, Cabral et al. 2005; Cabral and Hudson 2006) was followed. Interfacial tension of different liquids (MQ-Water, 10% EtOH, 40% EtOH and 96% EtOH, see also Table 3) in FC-40 oil was firstly measured using pendant droplet technique as described in Example 3 Material and Methods section. Second, the same liquids were then emulsified into 40 pL droplets and droplet deformation D was measured at the entrance of the coalescence channel, where droplets decelerated and experienced stretch transverse to the flow direction. The scalar droplet deformation parameter D defined as D=(a−b)/(a+b), where a and b is major and minor principal radii of the spheroid droplet. After finding corresponding D values, droplet deformation was normalized by droplet size $a_0$ and the data were plotted as a function of interfacial tension. Using identical conditions, D of 40 pL droplets produced with either 2% or 5% of EA-surfactant was also measured and obtained values were plotted on the reference curve.
Figure 15E:
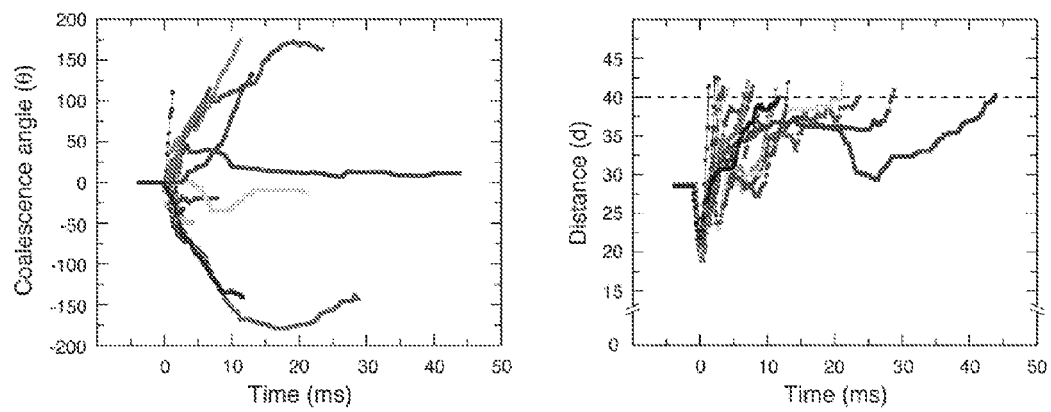
Figure 16A:
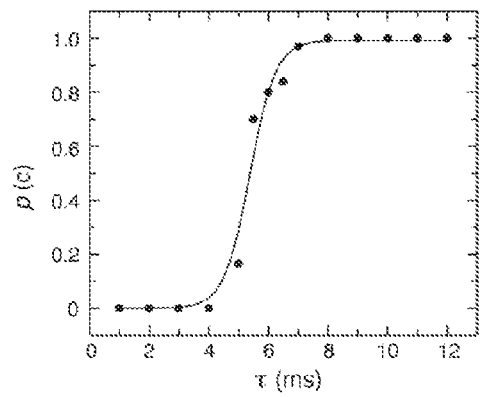
FIG. 16A. Droplet coalescence as a function of pairing time. The parameter p(c) is defined as a proportion of coalesced droplets n(1) over the total number of droplets: p(c)=n(1)Σin(i). Parameter τ is a time in which two droplets had stayed in physical contact within the pairing channel before entering the coalescence channel. At τ≥8 ms droplets pairs always coalesced p(c)=1, while at τ≤4 ms droplets pairs stayed unfused p(c)=0. Emulsion droplets were 15 pL and droplets produced on-chip were 20 pL volume. The dispersed phase was pure water and continuous phase was FC40 oil with 2% EA-surfactant.
Figure 16B:
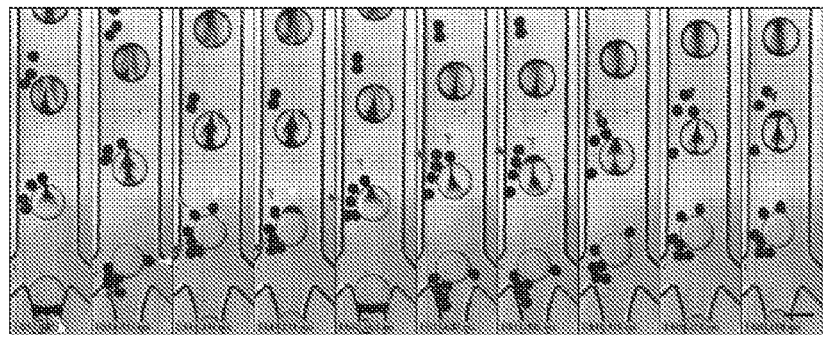
FIG. 16B-D. Time series of corresponding to: three-to-one (FIG. 16B), two-to-one (FIG. 16C), and one-to-one (FIG. 16D) coalescence events. Emulsion droplets are black and on-chip generated droplets are clear. Emulsion droplets in FIGS. 16B, C and D are 3 pL ($R_1$=9 µm), 5 pL ($R_1$=10.5 µm) and 15 pL ($R_1$=15.5 µm), respectively.
Figure 16C:
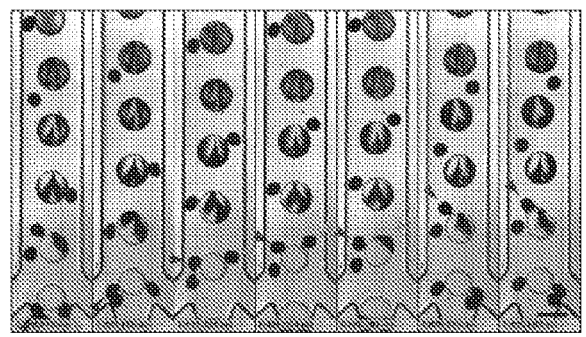
Figure 16D:
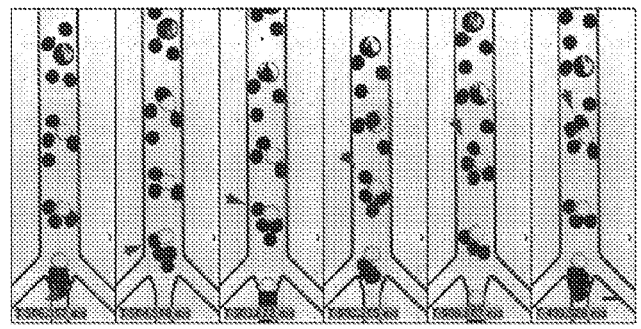

Monodispersed emulsion composed of 15 pL surfactant-stabilized droplets ($R_1$=15.5 µm) was created using microfluidic device containing a flow-focusing junction. The dispersed phase of emulsion consisted of 50 mM Methylene Blue dye dissolved in 100 mM Tris-HCl [pH 8.0] buffer and continuous phase was FC-40 fluorinated oil (perfluoro-tri-n-butylamine) containing 5% (w/w) EA-surfactant, which is a PFPE-PEG-PFPE tri-block copolymer. The surfactant-stabilized droplets were collected off-chip in form of an emulsion (~200 µl) and incubated for at least 1 hour to obtain interface coverage by surfactant. Interfacial tension measurements using pendant droplet technique showed that at 5% of surfactant, the surface tension decreases down to γ~6.6 mN/m after 1 hour (FIG. 12). Surfactant-stabilized droplets were then introduced into a microfluidic device (FIG. 14) where they were spaced and brought into a contact with another droplets produced on the same device. The latter droplets were 25 pl volume ($R_2$=18.5 µm) and contained buffer alone. The carrier oil used to produce and to space droplets contained 2% surfactant. At this surfactant concentration droplets produced on-chip reach γ~40 mN/m during the time they enter the coalescence chamber (FIG. 13). The decrease in interfacial tension from 53 mN/m (for surfactant-free liquids) to 40 mN/m indicates that droplets were only partly stabilized by surfactant. However, this was sufficient to prevent uncontrolled droplet coalescence upon physical contact with surfactant-stabilized droplets in the pairing channel (20×40×1000 µm³) leading to droplet pair formation that moved downstream the flow. Within the pairing channel droplets having a lower surface tension moved ~1.2-times faster due to lubrication effect (Klein, Kumacheva et al. 1994) and therefore were pushed into the back side of the droplets produced on the device by the laminar flow (FIG. 15). Since on-chip generated droplets in the pairing channel became pinched the interface area available for contact with surfactant-stabilized droplets remained nearly the same independent of the former droplet volume (FIG. 15C) assuring stable pair formation (and subsequent coalescence) at different regimes (from 16 to 104 pL tested). The time in which two droplets stayed in physical contact before reaching the end of the pairing channel was defined as a contact time τ. After a pair formation, droplets entered an expanded (coalescence) channel (20×100×1000 µm³), where droplet fusion was monitored. In order to control spacing between coming droplets pairs two oil inlets were incorporated between the coalescence and pairing channels (FIG. 14). Within the coalescence channel a surfactant-stabilized droplet slid over the surface of a surfactant-deficient droplet until the point where the pair of droplets became pulled apart by the hydrodynamic flow and coalesced (FIG. 15). The angle of coalescence in these conditions was θ=150±2° and the distance between two droplets prior coalescence was d=40±1 µm (defined as distance between two centres of mass, see FIG. 15A). To determine whereas coalescence angle play a role, droplets were paired for a defined time (τ=14±2 ms) but the flow in the coalescence channel ($Q_{cc}$) was varied, by introducing or removing out the carrier oil through two side oil inlets. The results indicate that independent on the flow velocity in the coalescence channel the angle of coalescence varied significantly (between −143 and 174 degrees), while the distance between two droplets prior a coalescence event in all the cases remained nearly the same, d=42±1.5 µm (FIG. 15E). At higher flow rates ($Q_{cc}$>400 µL/hr) droplet pairs were dragged closer to the channel wall and sliding motion was prevented. However, in these conditions coalescence could be induced by a zig-zag channel, as described above, placed 1 mm downstream the coalescence chamber. Altogether, obtained results imply that coalescence angle is not a major parameter describing droplet coalescence but it is rather a result of the time point when two droplets become pulled apart. Based on these observations it is more likely that drainage of the oil film between two interfaces does not occur during sliding motion but during the pairing time τ. To investigate it in more details surfactant concentration in FC-40 oil was fixed at 2%, and droplet coalescence was monitored at different τ values. As expected, droplet coalescence was dependent on factor τ. For a given droplet size, at τ>8 ms separation always led to coalescence, and in contrast when τ<4 ms coalescence efficiency decreased (FIG. 16A). Droplet fusion efficiency and most importantly the selectivity were not affected even when the surfactant-stabilized droplets introduced into the device were in large excess (FIG. 16). This was achieved by exploiting geometrical constrains imposed by the pairing channel: a cross-section area of the pairing channel ($A_{pc}$=800 µm²) was close to the cross-section of the sphere of a single surfactant-stabilized droplet ($A_{15pl}$~755 µm²). Therefore, within the multiple droplet complexes only one surfactant-stabilized droplet could get in physical contact with on-chip droplet and consequently only the paired droplet experienced fusion in the coalescence channel. Once again, the coalescence angle varied significantly depending on the spatiotemporal position and amount of droplets within the coalescence channel, while the distance between two droplets prior a coalescence event stayed nearly the same (FIG. 17).

The geometrical constrains of the pairing channel were then exploited to obtain selective multiple coalescence events. Four emulsions composed of 3, 5, 10 and 20 pL droplets were created and incubated for 1 hour prior introduction back into a micro fluidic device. As expected, the number of coalescence events corresponded exactly to the number of emulsion droplets being in physical contact (τ>4 ms) with droplets produced on-chip (FIG. 16). For example, when an emulsion composed of either 10 pL ($A_{10pl}$~575 µm²) or 20 pL droplets ($A_{20pl}$~908 µm²) was introduced all pairing and coalescence events were 1-to-1 (one reinjected droplets fused to one droplet produced on-chip, FIGS. 18 and 19). When emulsion composed of 5 pL droplets ($A_{5pL}$~346 µm$^2$) was introduced, double fusion events (2-to-1) were observed: two reinjected droplets fused to a single droplet produced on the device. Finally, 3 pL droplets ($A_{3pL}$~255 µm$^2$) showed triple (3-to-1) fusion events. Indeed, for smaller droplets, fusion events corresponding to 1-to-1 and 2-to-1 could also be obtained by simply varying the number of droplets being paired. Hence, by using different sizes of surfactant-stabilized droplets and controlling the number or droplet pairs, highly selective coalescence events were obtained. Alternatively, it could be possible to control the number of fusion events by simply changing the cross-section of the pairing channel of the microfluidic device.

Droplet coalescence was achieved in both, symmetric ($R_1$=$R_2$) and asymmetric ($R_1$>$R_2$ or $R_1$<$R_2$) scenarios (FIG. 19). Droplet coalescence was also not affected by the content of the droplets (see Material and Methods) or the flow rates of the system (from 0.1 to 0.01 m s$^{-1}$ tested). However, as could be expected, droplet fusion efficiency was affected by the surfactant amount in the carrier oil. When surfactant concentration in carrier oil was increased up to 5% the interface of droplets produced on-chip reached γ~15 mN/m at the time they entered the coalescence channel. In these conditions, coalescence efficiency decreased. On another hand, when surfactant concentration was decreased down to ≤1% interface, uncontrolled droplet fusion could be observed at the reinjection junction and other parts of the device, during both decompression and compression regimes. However, 2% of surfactant was sufficiently high to prevent droplets against uncontrolled coalescence but low enough to resist selective droplet fusion in the coalescence channel. After the coalescence, surfactant molecules from the surfactant-stabilized droplets diffused into the newly formed interface and prevented fused droplets from other uncontrolled coalescence events, thereby fused droplets could be collected off-chip for further manipulations and analysis.

Droplets coalescence was tested using FC-77 (perfluorooctane) and Galden-HT135 (perfluoropolyether) fluorinated oils and the same trend was observed. At low concentrations of surfactant (<1%) droplets were unstable, while at high concentrations of surfactant (~10%) droplets became resistant to coalescence. In the intermediate regime (2% for Galden-HT135 and 5% for FC77) droplets were fusing according to the number of droplets being paired. Droplet coalescence in FC-40 oil was then tested using different fluorosurfactant, which contains fluorinated poly(propylene) tail (based on Krytox®) grafted to dimorpholino phosphate head group. Due to fast interface stabilization by this surfactant (Baret, Kleinschmidt et al. 2009), droplet coalescence was achieved at lower concentrations (~0.1%). As in previous cases, coalescence mechanism was the same; initially droplets formed stable pair and then, within the coalescence chamber, surfactant-stabilized droplets slid over the surface of the on-chip droplets and coalesced during the separation phase. Altogether these results show that exploiting the dynamics of interface stabilization by surfactant, it is possible to achieve reliable and selective droplet coalescence independently of the carrier oil or surfactant.

The micro fluidic system presented herein allows coalescence of surfactant-stabilized (emulsion) droplets in highly controllable and selective fashion without the need of external power sources. The coalescence of droplets was induced by hydrodynamic flow causing a separation.

Example 4

In this example droplet fusion module contains expansions 40 µm wide and 110 µm long and 20 µm deep connected by constriction of 20 µm wide and 100 µm long and 20 µm deep (FIGS. 20 and 21). The series of expansion and constriction causes fusion by inducing successive accelerations and decelerations and/or successive reorientations and/or rearrangements in space and time.

In this particular example, clear droplets (around 20 pL volume) were generated at around 0.7 kHz with FC-40 carrier oil containing 0.55% (w/w) EA-surfactant. Reinjected droplets (black) were around 3 pL volume and were produced on a separate microfluidic chip using 1.1% (w/w) EA-surfactant in HFE-7500 oil. Reinjected droplets were introduced into microfluidic chip at around 1.0 kHz and spaced with FC-40 carrier oil containing 0.55% (w/w) EA-surfactant. Stabilization oil contained 1% (w/w) EA-surfactant.

Droplets generated on-chip (clear) are not stabilized by surfactant before they reach droplet fusion module. However, these droplets become stabilized by surfactant before they reach the collection outlet because surfactant molecules are given enough time to diffuse into the interface and to stabilize it.

Example 5

Figure 22:
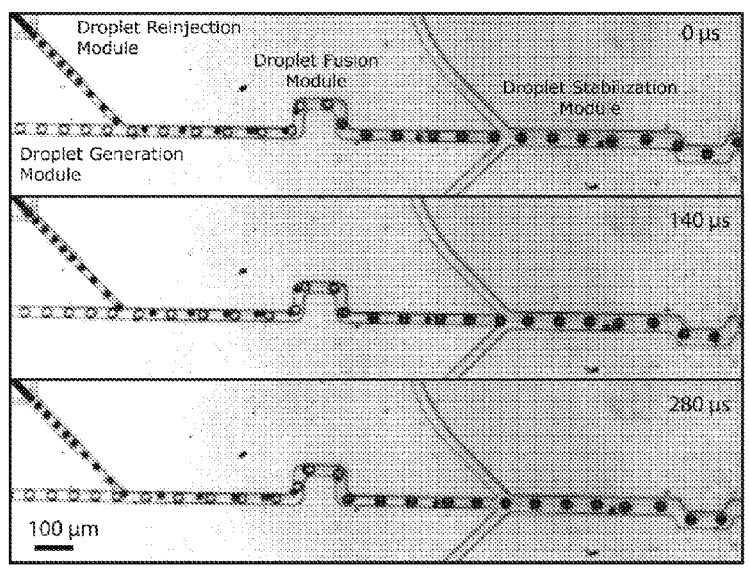
FIG. 22: Light micrographs of the droplet coalescence in the droplet fusion module comprising serpentine channel. The images show one-to-one fusion of surfactant-stabilized droplets (black) with droplets that are partially stabilized by surfactant (clear). Time scale between images is given in μs. Scale bar 100 μm.

In this particular example, clear droplets (partially stabilized by surfactant) were around 10 pL volume and were generated with FC-40 carrier oil containing around 0.1% (w/w) EA-surfactant at around 1.44 kHz frequency. Reinjected droplets (stabilized by surfactant; black) were around 3 pL volume and were produced on a separate microfluidic chip using 1.1% (w/w) EA-surfactant in HFE-7500 oil. Reinjected droplets were introduced into microfluidic chip at around 2.5 kHz and spaced with FC-40 carrier oil containing around 0.1% (w/w) EA-surfactant. Droplets were brought in contact for at least 1 ms in the pairing channel connecting droplet fusion and droplet reinjection modules. Droplet pairs and multiple droplets clusters entering serpentine channel of 30 µm wide and 20 µm deep and around 500 µm long, experienced successive accelerations and decelerations and/or successive reorientations and rearrangements in space and time and consequently fused (FIG. 22). Fused droplets were further stabilized by additional surfactant molecules provided by the stabilization oil injected in the system just after the fusion. The EA-surfactant concentration in the stabilization oil was 1% (w/w).

Example 6

In this particular example clear droplets were around 330 pL volume and were generated with FC-40 carrier oil containing around 0.1% (w/w) EA-surfactant at around 0.085 kHz frequency. Reinjected droplets (black) were around 20 pL volume and were produced on a separate microfluidic chip using 1.1% (w/w) EA-surfactant in HFE-7500 oil. Reinjected droplets were introduced into microfluidic chip at around 0.081 kHz and spaced with FC-40 carrier oil containing around 0.1% (w/w) EA-surfactant.

Figure 23:
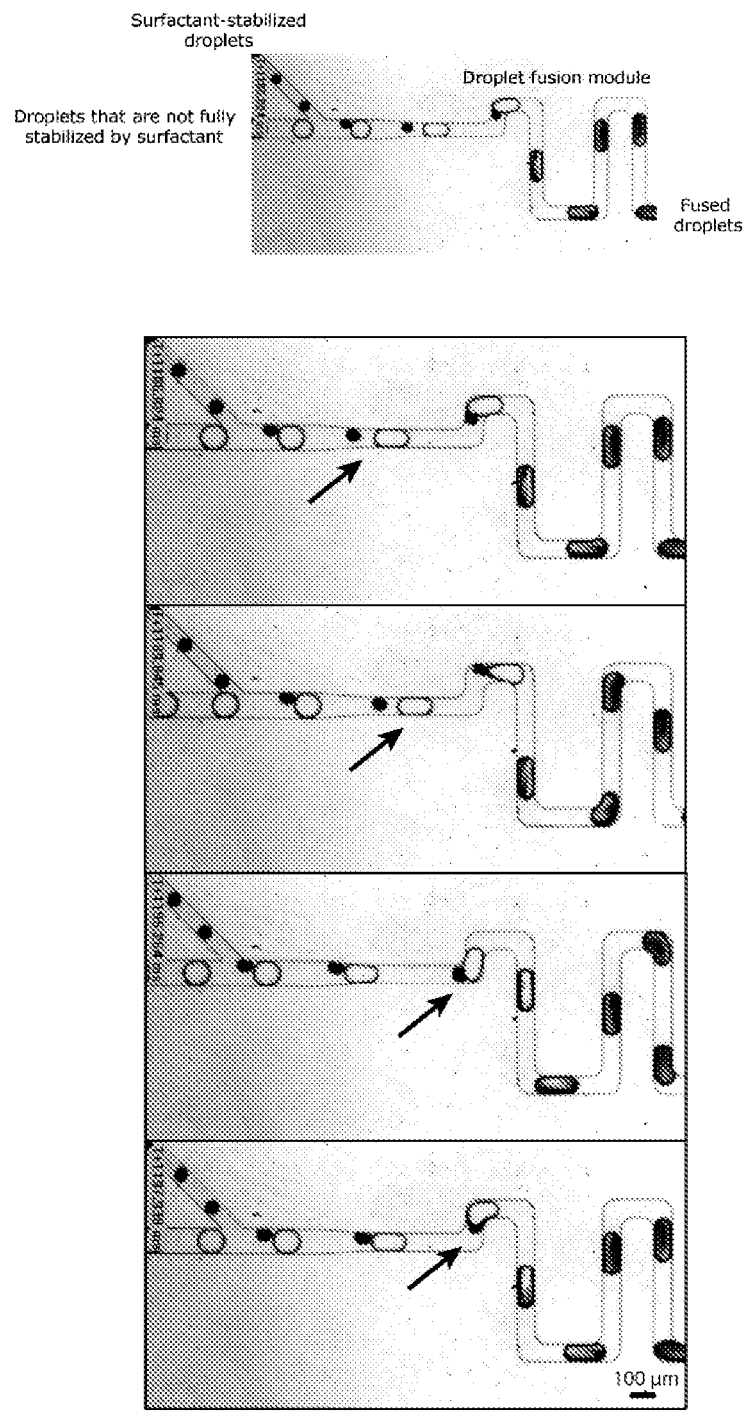
FIG. 23: Light micrographs of the droplet coalescence in the droplet fusion module comprising serpentine channel. The images show one-to-one fusion of surfactant-stabilized droplets (black) with droplets that are partially stabilized by surfactant (clear). Time scale between images is given in grey boxes. Scale bar 100 μm. Black arrows indicate fusion event in which single surfactant-stabilized droplets fused to a single droplet generated on-chip (partially stabilized by surfactant).

Droplet pairs entering a serpentine channel of 70 µm wide, 20 µm deep and about 4 mm long, experienced successive accelerations and decelerations and/or successive reorientations and rearrangements in space and time and consequently fused (FIG. 23).

This invention has been described with reference to various specific and exemplary embodiments and techniques. However, it should be understood that many variations and modifications will be obvious to those skilled in the art from the foregoing detailed description of the invention and be made while remaining within the spirit and scope of the invention.

REFERENCES

Abate, A. R., A. Poitzsch, et al. (2009). "Impact of inlet channel geometry on microfluidic drop formation." Physical Review E 80 (2): 026310-5.

Abate, A. R., D. Lee, et al. (2008). "Glass coating for PDMS microfluidic channels by sol-gel methods." Lab on a Chip 8 (4): 516-518.

Ahn, K., Agresti, J., Chong, H., Marquez, M. & Weitz, D. A. Electrocoalescence of drops synchronized by size-dependent flow in microfluidic channels. Appl Phys Lett 88, 264105-264103 (2006).

Ash, M. and I. Ash (1997). Handbook of industrial surfactants: an international guide to more than 21,000 products by trade name, composition, function, and manufacturer. Aldershot, Gower.

Baret et al., Lab Chip, 2009, 9, 1850-1858.

Baret, J. C., F. Kleinschmidt, et al. (2009). "Kinetic aspects of emulsion stabilization by surfactants: a microfluidic analysis." Langmuir 25 (11): 6088-93.

Baroud, C. N., de Saint Vincent, M. R. & Delville, J. P. An optical toolbox for total control of droplet microfluidics. Lab Chip 7, 1029-1033 (2007).

Beer et al., Anal Chem, 2007, 79, 8471-8475.

Bremond, N., Thiam, A. R. & Bibette, J. Decompressing emulsion droplets favors coalescence. Phys Rev Lett 1, 024501-024504 (2008).

Cabral, J. T. and S. D. Hudson (2006). "Microfluidic approach for rapid multicomponent interfacial tensiometry." Lab on a Chip 6 (3): 427-436.

Chabert and Viovy, PNAS, 2008, 105, 3191-3196.

Christopher et al., Lab Chip, 2009, 9, 1102-1109.

Cristobal et al., Appl. Phys. Lett., 2006, 89, 034104.

Cygan, Z. T., J. T. Cabral, et al. (2005). "Microfluidic platform for the generation of organic-phase microreactors." Langmuir 21 (8): 3629-3634.

Engl et al., Phys. Rev. Lett., 2005, 95, 208304.

Fidalgo, L. M., Abell, C. & Huck, W. T. S. Surface-induced droplet fusion in microfluidic devices. Lab Chip 7, 984-986 (2007).

Frenz, L. et al. Droplet-based microreactors for the synthesis of magnetic iron oxide nanoparticles. Angew Chem Int Ed Engl 47, 6817-6820 (2008).

Fuerstman et al., Lab Chip, 2007, 7, 1479-1489.

Fuh and Giddings, J. Microcolumn Separations, 1997, 9, 205-211.

Garstecki, P., H. A. Stone, et al. (2005). "Mechanism for flow-rate controlled breakup in confined geometries: A route to monodisperse emulsions." Physical Review Letters 94 (16): 164501 (4).

Garstecki, P., M. J. Fuerstman, et al. (2006). "Formation of droplets and bubbles in a microfluidic T-junction—scaling and mechanism of break-up." Lab on a Chip 6 (3): 437-446.

Griffiths, A. D. & Tawfik, D. S. Miniaturising the laboratory in emulsion droplets. Trends Biotechnol 24, 395-402 (2006).

Holtze, C. et al. Biocompatible surfactants for water-in-fluorocarbon emulsions. Lab Chip 8, 1632-1639 (2008).

Hudson, S. D., J. T. Cabral, et al. (2005). "Microfluidic interfacial tensiometry." Applied Physics Letters 87 (8): 081905 (3).

Huebner et al., Lab Chip, 2008, 8, 1244-1254.

Huebner et al., Lab Chip, 2009, 9, 692-698.

Huh et al., Anal Chem, 2007, 79, 1369-1376.

Hung, L. H. et al. Alternating droplet generation and controlled dynamic droplet fusion in microfluidic device for CdS nanoparticle synthesis. Lab Chip 6, 174-178 (2006).

Klein, J., E. Kumacheva, et al. (1994). "Reduction of Frictional Forces between Solid-Surfaces Bearing Polymer Brushes." Nature 370 (6491): 634-636.

Link et al., Phys. Rev. Lett., 2004, 92, 054503.

Link, D. R. et al. Electric control of droplets in microfluidic devices. Angew Chem Int Ed Engl 45, 2556-2560 (2006).

Liu, Y. & Ismagilov, R. F. Dynamics of coalescence of plugs with a hydrophilic wetting layer induced by flow in a microfluidic chemistrode. Langmuir 25, 2854-2859 (2009).

Maenaka et al., Langmuir, 2008, 24, 4405-4410.

Mardis, E. R. Next-generation DNA sequencing methods. Annu Rev Genomics Hum Genet 9, 387-402 (2008).

Mazutis et al, Lab Chip, 2009a, DOI:10.1039/B903608C.

Mazutis et al, Lab Chip, 2009b, DOI:10.1039/B907753G.

Mazutis et al., Anal Chem, 2009c, 81, 4813-4821.

Mazutis et al., Lab Chip, 2009, 9, 2665-2672.

Niu, X., Gulati, S., Edel, J. B. & deMello, A. J. Pillar-induced droplet merging in microfluidic circuits. Lab Chip 8, 1837-1841 (2008).

Priest, C., Herminghaus, S. & Seemann, R. Controlled electrocoalescence in microfluidics: Targeting a single lamella. Appl Phys Lett 89, 134101 (2006).

Sassa, F., Fukuda, J. & Suzuki, H. Microprocessing of liquid plugs for bio/chemical analyses. Analytical Chemistry 80, 6206-6213 (2008).

Sjöblom, J. (2006). Emulsions and emulsion stability. Boca Raton, Taylor & Francis.

Song, H., Tice, J. D. & Ismagilov, R. F. A microfluidic system for controlling reaction networks in time. Angew. Chem. Int. Ed. Engl. 42, 767-772 (2003).

Tan and Lee, Lab Chip, 2005, 5, 1178-1183.

Tan et al., Lab Chip, 2004, 4, 292-298.

Tan, et al., Microfluid Nanofluid, 2008, 4, 343-348.

Tan, Y. C., Ho, Y. L. & Lee, A. P. Droplet coalescence by geometrically mediated flow in microfluidic channels. Microfluidics and Nanofluidics 3, 495-499 (2007).

Tawfik, D. S. & Griffiths, A. D. Man-made cell-like compartments for molecular evolution. Nat Biotechnol 16, 652-656 (1998).

The et al., Lab on a Chip, 2008, 8, 198-220.

Thorsen, T., R. W. Roberts, et al. (2001). "Dynamic pattern formation in a vesicle-generating microfluidic device." Physical Review Letters 86 (18): 4163-4166.

Um, E. & Park, J. K. A microfluidic abacus channel for controlling the addition of droplets. Lab Chip 9, 207-212 (2009).

Utada, A. S., E. Lorenceau, et al. (2005). "Monodisperse double emulsions generated from a microcapillary device." Science 308 (5721): 537-541.

Wanka, G., H. Hoffmann, et al. (1994). "Phase-Diagrams and Aggregation Behavior of Poly(Oxyethylene)-Poly(Oxypropylene)-Poly(Oxyethylene) Triblock Copolymers in Aqueous-Solutions." Macromolecules 27 (15): 4145-4159.

Xia, Y. N. and G. M. Whitesides (1998). "Soft lithography." Annu Rev. Mater. Sci. 28: 153-184.

Xu, J. H., S. W. Li, et al. (2006). "Controllable preparation of monodisperse O/W and W/O emulsions in the same microfluidic device." Langmuir 22 (19): 7943-7946.

Yang et al., Lab Chip, 2009, 9, 145-150.

Yobas, L., S. Martens, et al. (2006). "High-performance flow-focusing geometry for spontaneous generation of monodispersed droplets." Lab on a Chip 6 (8): 1073-1079.

Zheng, B. & Ismagilov, R. F. A micro fluidic approach for screening submicroliter volumes against multiple reagents by using preformed arrays of nanoliter plugs in a three-phase liquid/liquid/gas flow. Angew Chem Int Ed Engl 44, 2520-2523 (2005).

The invention claimed is:

1. A method for fusing droplets in a chip comprising (i) providing a first set of droplets which are partially or not stabilized by surfactant, (ii) providing a second set of droplets which are stabilized by surfactant, (iii) contacting each droplet of the first set with single or multiple droplets of the second set in a pairing module and (iv) fusing droplets of the first set with droplets of the second set through a droplet fusion module in which the droplets experience at least one acceleration and/or deceleration and/or reorientation and/or rearrangement in space and time.

2. The method according to claim 1, wherein the chip is a microfluidic chip.

3. The method according to claim 1, wherein the droplets experience, in the droplet fusion module, successive accelerations and decelerations and/or successive reorientations and rearrangements in space and time.

4. The method according to claim 1, wherein the droplet fusion module comprises a channel in which the cross-sectional area perpendicular to the direction of the flow varies along its length.

5. The method according to claim 4, wherein the droplet fusion module comprises a channel with a geometry comprising at least one expansion portion and at least one constriction portion, said at least one expansion portion having a width ranging from 10 µm to 10 mm, said at least one constriction portion having a width ranging from 10 µm to 9 mm, each expansion or constriction portion having a length ranging from 10 µm to 10 mm.

6. The method according to claim 1, wherein the droplet fusion module comprises a channel with a zigzag geometry.

7. The method according to claim 6, wherein the zigzag geometry comprises segmented channels with a width ranging from 10 µm to 10 mm, and a length ranging from 10 µm to 10 mm, connected at an angle ranging from 45° to 170°, by sections with a width ranging from 10 µm to 10 mm, and with a depth ranging from 10 µm to 10 mm.

8. The method according to claim 1, wherein the droplet fusion module comprises a channel with a cross section which is sufficient to allow droplets of the second set which are paired with droplets of the first set to slide over the surface of droplets of the first set until a position where droplets are pulled apart by the hydrodynamic flow.

9. The method according to claim 1, wherein in step (iii) each droplet of the first set is brought into contact with one droplet of the second set.

10. The method according to claim 1, wherein in step (iii) each droplet of the first set is brought into contact with several droplets of the second set.

11. A method for conducting a chemical or biological reaction comprising performing the method according to claim 1 wherein the first set of droplets contains a first set of reactants and the second set of droplets contains a second set of reactants and wherein the droplet fusion is used to initiate, terminate or modify the chemical or biological reaction.

12. The method according to claim 11, wherein a carrier oil and a surfactant are used to generate the first and the second set of droplets and said carrier oil is a fluorinated oil and said surfactant is a tri-block copolymer.

* * * * *

UNITED STATES PATENT AND TRADEMARK OFFICE
CERTIFICATE OF CORRECTION

| | | |
|---|---|---|
| PATENT NO. | : 9,446,360 B2 | |
| APPLICATION NO. | : 13/319180 | |
| DATED | : September 20, 2016 | |
| INVENTOR(S) | : Linas Mazutis | |

It is certified that error appears in the above-identified patent and that said Letters Patent is hereby corrected as shown below:

In the Specification

Column 1,
Line 21, "micro fluidic" should read --microfluidic--.
Line 49, "'next-generation'high-throughput" should read --'next-generation' high-throughput--.

Column 2,
Line 18, "micro fluidics" should read --microfluidics--.
Line 38, "micro fluidic" should read --microfluidic--.

Column 4,
Line 41, "micro fluidic" should read --microfluidic--.

Column 8,
Line 46, "micro fluidic" should read --microfluidic--.

Column 9,
Line 59, "nano fluidic" should read --nanofluidic--.
Line 60, "macro fluidic" should read --macrofluidic--.
Line 61, "micro fluidic" should read --microfluidic--.

Column 23,
Line 31, "performed" should read --preformed--.
Line 66, ">0.05%" should read --≥0.05%--.

Column 29,
Line 50, "micro fluidic" should read --microfluidic--.

Signed and Sealed this
Twenty-seventh Day of December, 2016

Michelle K. Lee
*Director of the United States Patent and Trademark Office*

CERTIFICATE OF CORRECTION (continued)
U.S. Pat. No. 9,446,360 B2

Column 30,

Line 2, "$a = 12\left[\frac{1-192H}{\pi^5 W}\text{tanH}\left(\frac{\pi W}{2H}\right)\right]^{-1}$" should read -- $a = 12\left[\frac{1-192H}{\pi^5 W}\text{tanh}\left(\frac{\pi W}{2H}\right)\right]^{-1}$ --.

Line 7, "7800" should read -- ~7800--.

Column 34,
Line 60, "micro fluidic" should read --microfluidic--.

Column 35,
Line 58, "micro fluidic" should read --microfluidic--.

In the Claims

Column 40,
Line 8, Claim 7, "10 μto" should read --10 μm to--.